(12) United States Patent
Kosaka et al.

(10) Patent No.: US 9,298,820 B2
(45) Date of Patent: Mar. 29, 2016

(54) DIGEST VIDEO GENERATION APPARATUS

(71) Applicant: Sony Corporation, Tokyo (JP)

(72) Inventors: Junichi Kosaka, Tokyo (JP); Tatsuya Hama, Tokyo (JP); Kenichi Yoneda, Tokyo (JP); Takamoto Tsuda, Tokyo (JP); Yukiko Akiyama, Tokyo (JP)

(73) Assignee: Sony Corporation, Tokyo (JP)

( * ) Notice: Subject to any disclaimer, the term of this patent is extended or adjusted under 35 U.S.C. 154(b) by 26 days.

(21) Appl. No.: 14/053,240

(22) Filed: Oct. 14, 2013

(65) Prior Publication Data

US 2015/0104147 A1    Apr. 16, 2015

(51) Int. Cl.
*H04N 5/77* (2006.01)
*G06F 17/30* (2006.01)

(52) U.S. Cl.
CPC .... *G06F 17/30784* (2013.01); *G06F 17/30056* (2013.01); *G06F 17/30837* (2013.01)

(58) Field of Classification Search
USPC .................................. 386/210–211, 223–229
See application file for complete search history.

(56) References Cited

U.S. PATENT DOCUMENTS

2008/0260346 A1* 10/2008 Sukeda et al. .................. 386/46
2011/0217019 A1*  9/2011 Kamezawa et al. ........... 386/224

FOREIGN PATENT DOCUMENTS

JP          2011-82915           4/2011

* cited by examiner

*Primary Examiner* — Nigar Chowdhury
(74) *Attorney, Agent, or Firm* — Oblon, McClelland, Maier & Neustadt, L.L.P

(57) ABSTRACT

A terminal device includes circuitry configured to acquire designated image data stored in a memory. The circuitry may sort the designated image data based on a time at which the designated image data was captured. The circuitry may divide the sorted image data into a plurality of time slots and calculate, based on features of the designated image data corresponding to each time slot of the plurality of time slots, a time slot score for each of the plurality of time slots. The circuitry may allocate, based on the time slot score, a portion of a digest video to each of the plurality of time slots. The circuitry may generate, for each time slot, a local digest video by assigning an amount of the designated image data to the local digest video corresponding to the time slot, and generate the digest video by connecting the generated local digest videos.

20 Claims, 12 Drawing Sheets

DIGEST VIDEO GENERATION APPARATUS

BACKGROUND

1. Technical Field

Aspects of the present disclosure relate to generating a digest video from stored image data.

2. Description of Related Art

A terminal device and/or a server may store moving image data (i.e., video) and/or still image data (i.e., pictures). Alternatively, the terminal device and/or server may acquire still and/or moving image data, e.g., by communicating with other devices on a network. For example, a specified or unspecified user may access stored image data on a server for local viewing. Additionally, a user seeking to view image data may search for image data stored on a terminal device and/or server, e.g., by searching for a title or description of the image data. Image data matching the user's search criteria may then be acquired for viewing. Large amounts of image data may be subject to the search and therefore, a large quantity of search results matching the search criteria may be returned.

SUMMARY

A server or a terminal device can that can efficiently generate a digest video (i.e., a summary) that accurately represents features of the stored image data improves convenience to the user. Among other things, aspects of the present disclosure are drawn to devices and methods to efficiently and effectively generate a digest video from still and/or moving image data.

According to one embodiment of the present disclosure, a terminal device includes circuitry configured to acquire designated image data stored in a memory. The circuitry may sort the designated image data based on a time at which the designated image data was captured. The circuitry may divide the sorted image data into a plurality of time slots and calculate, based on features of the designated image data corresponding to each time slot of the plurality of time slots, a time slot score for each of the plurality of time slots. The circuitry may allocate, based on the time slot score, a portion of a digest video to each of the plurality of time slots. The circuitry may generate, for each time slot, a local digest video by assigning an amount of the designated image data to the local digest video corresponding to the time slot, and generate the digest video by connecting the generated local digest videos.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
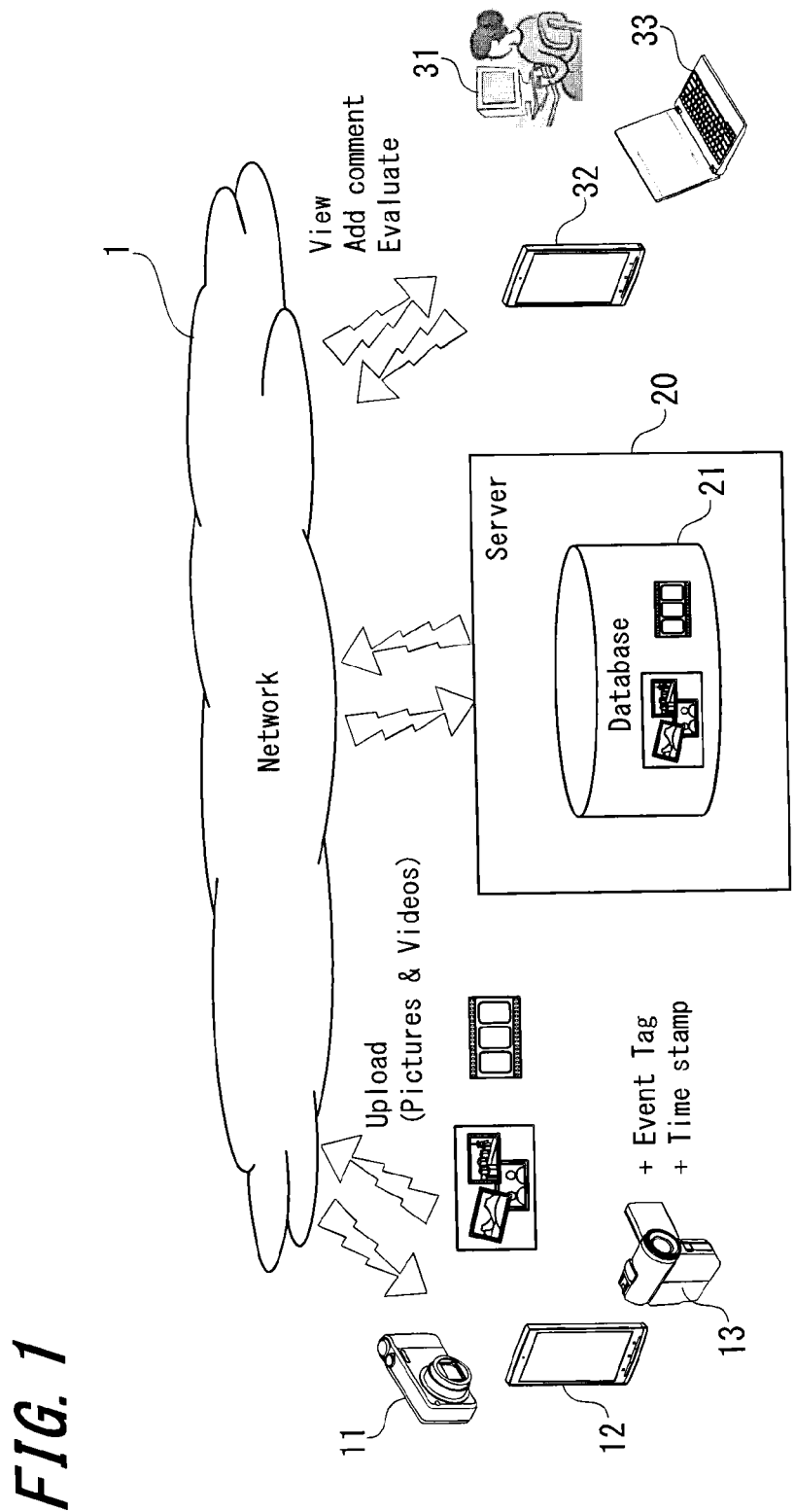
FIG. 1 illustrates an exemplary system overview for generating a digest video according to one aspect of the present disclosure.

Referring now to the drawings, wherein like reference numerals designate identical or corresponding parts throughout the several views.

Referring first to FIG. 1, FIG. 1 illustrates an exemplary system overview for generating a digest video according to one aspect of the present disclosure. In the example shown in FIG. 1, the exemplary system includes terminal devices 11, 12, and 13, which are respectively illustrated as a camera, a smartphone, and a video recorder. The terminal devices 11, 12, and 13, are illustrated in FIG. 1 as being connected to a network 1 via a wireless communication channel(s). According to this example, image data (e.g., moving video data and/or static image data) photographed by one or more of the terminal devices illustrated in FIG. 1 may be uploaded to a server 20 via the network 1. In the case in which moving video data is uploaded to the server 20, corresponding audio data may also be uploaded.

The exemplary system of FIG. 1 assumes that the terminal devices 11, 12, and 13 include communication processing circuitry such that the terminal devices may communicate on the network 1. For example, the smartphone embodied by the terminal device 12 may, in certain aspects of the present disclosure, include a camera for capturing image data and also include a communication processor and an image processor for processing and uploading the image to an external device via the network 1. As a further example, a camera such as the terminal device 11 may include a communication processor and corresponding antenna for transmitting image data via the network 1 wirelessly.

It should be appreciated that the present disclosure assumes "image data" includes one or both of still images (i.e., pictures) and moving image data (i.e., videos). For example, image data for a particular event may be uploaded to the server 20 via the terminal devices 11, 12, and/or 13 such that both still images and video data corresponding to the particular event are stored on the server 20.

In addition to the raw image data captured by the terminal devices, the terminal devices of FIG. 1 may, in certain aspects of the present disclosure, upload corresponding metadata to the server 20 along with the captured image data. For example, the terminal devices of FIG. 1 may generate a timestamp when image data is captured by one or more of the respective terminal devices, and the timestamp may be appended to the image data as metadata. Other exemplary metadata that may be appended to image data captured by the terminal devices includes a geospatial location corresponding to a location at which image data is captured, an event tag showing the event name at which the image data is captured, text data that a user enters to describe the image data captured by the terminal devices, user information corresponding to the image data (e.g., a terminal device owner, names of people captured in the image data, etc.), device information (e.g., a camera model, camera settings, lens type, etc.), or the like. Moreover, data indicating one or more users authorized to access the image data may be appended to the uploaded image data as metadata. For example, a user capturing image data may authorize a specific group of users access to the image data once the image data is uploaded to the server 20 via the network 1.

According to the examples shown in FIG. 1, the uploaded image data received at the server 20 is stored in a database 21. The database 21 may include one or more storage mediums, such as one or more volatile and/or non-volatile memory arrays. Moreover, in certain aspects of the present disclosure, the database 21 may perform processing on the image data received at the server 20 such that, for example, a filing structure may be generated based on the metadata. For example, processing circuitry included in the server 20 may analyze the metadata included in the received image data to determine, e.g., an event at which the image data was captured and create an electronic filing folder to store all image data associated with the event in a common file.

While the aforementioned example discussed with respect to FIG. 1 assumes that the terminal devices 11, 12, and 13 upload image data to the server 20, it should also be appreciated that the terminal devices 11 through 13 may also access the server 20 to download image data stored in the database 21. Moreover, other terminal devices that do not directly upload image data to the server 20 may access the server 20 via the network 1 such that image data may be downloaded and/or otherwise viewed (e.g., streamed) on the other terminal devices. For example, the terminal devices 31, 32, and 33 in FIG. 1 may search videos by entering a text description corresponding to an event, and in response to receiving the search request, the server 20 may analyze the image data in the database 21 to determine matching image data (e.g., based on matching metadata) and return the matching image data to the terminal devices. Further, in certain aspects of the present disclosure, a terminal device such as the terminal devices 31 through 33 may transmit comments or other information relating to the image data (e.g., an indication of a user's affinity for the image data) to the server 20, and the uploaded comments may be stored as metadata. For example, a user may request to view one or more image files stored on the server 20 and, in response to viewing the image data, enter a user comment via an interface on the respective terminal device. As a further example, one or more of the terminal devices 31 through 33 may enter a character string comment corresponding to image data viewed from the server 20, and the terminal device may upload the comment to the server 20 such that the comment is stored as metadata associated with the corresponding image data in the database 21. Exemplary comments that may be uploaded and stored as metadata in the database 21 include character string comments, a binary-type indication of a user's affinity for image data (e.g., a "like" or "dislike" indication, a thumbs-up or thumbs-down, etc.), a numerical rating based on a predetermined scale, a vote, a star rating, etc.

In certain aspects of the present disclosure, the server 20 may include processing circuitry for generating a digest video based on image data stored in the database 21. That is, the server 20, in certain embodiments, may operate as a digest video production apparatus, and generate a digest video using image data, e.g., corresponding to a specific group of images stored in the database 21. However, as will be discussed further in later paragraphs, other devices may also embody a digest video production apparatus by executing digest video generation processing described herein. For example, one or more of the terminal devices 11 through 13 may act as a digest video production apparatus by directly capturing image data and/or downloading an image data from an external server such as server 20, and performing digest video generation processing on the captured and/or accumulated image data.

In generating a digest video, processing circuitry included in the server 20 or one of the terminal devices illustrated in FIG. 1 may analyze full-length image data included in one or more image files corresponding to a particular event (or another categorical indication, based on the metadata), extract one or more segments from the one or more image files corresponding to the particular event, and generate a shorter summary/overview digest video using the segments of the main, full-length image data. In the case in which moving video data is utilized to generate a digest video, segments of the moving video data may be extracted from full-length image data including a plurality of video data segments, and the segments may be connected sequentially to form a digest video. In the case in which still images are utilized to generate a digest video, the still images may be selected from a plurality of still image files included in the image data, and the still images may be displayed sequentially, whereby the displayed still image data may be displayed for a predetermined amount of time (e.g., several seconds per image). Moreover, a digest video including both moving video data and still image data may be generated using a combination of the aforementioned techniques.

Figure 2:
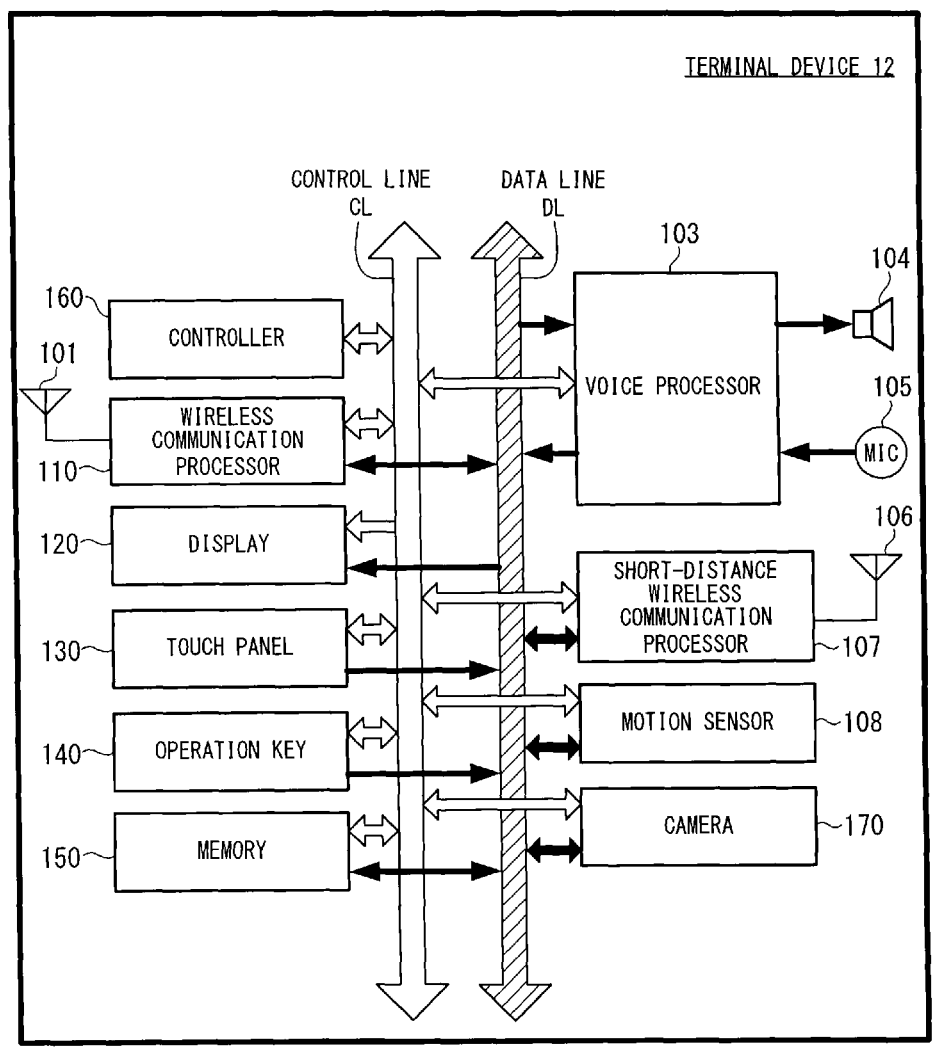
FIG. 2 illustrates an exemplary block diagram for a terminal device according to one aspect of the present disclosure.

FIG. 2 illustrates a block diagram for an exemplary terminal device according to one aspect of the present disclosure. For simplicity, the examples that follow are described in reference to a smartphone such as terminal device 12. However, the skilled artisan will appreciate that the processing described herein may be adapted such that digest video generation features are implemented on other devices (e.g., a desktop computer, a laptop, a tablet, a server, an e-reader, a camera, etc.).

Referring now to FIG. 2, the exemplary terminal device of FIG. 2 includes a controller 160, a wireless communication processor 110 connected to an antenna 101, a speaker 104, a microphone 105, and a voice processor 103.

The controller 160 may include one or more Central Processing Units (CPUs), and may control each element in the terminal device 12 to perform features related to communication control, audio signal processing, control for the audio signal processing, image processing and control, and other kinds signal processing. The controller 160 may perform these features by executing instructions stored in a memory 150. Alternatively or in addition to the local storage of the memory 150, the features may be executed using instructions stored on an external device accessed on a network, or on a non-transitory computer readable medium.

The memory 150 may include, e.g., Read Only Memory (ROM), Random Access Memory (RAM), or a memory array comprised of a combination of volatile and non-volatile memory units. The memory 150 may be utilized as working memory by the controller 160 while executing the processing and algorithms of the present disclosure. Additionally, the memory 150 may be used for long-term storage, e.g., of image data and information related thereto.

The terminal device 12 includes a control line CL and data line DL as internal communication bus lines. Control data to/from the controller 160 may be transmitted through the control line CL. The data line DL may be used for transmission of voice data, display data, etc.

The antenna 101 transmits/receives electromagnetic wave signals between base stations for performing radio-based communication, such as the various forms of cellular telephone communication.

The wireless communication processor 110 controls the communication performed between the terminal device 12 and other external devices via the antenna 101. For example, the wireless communication processor 110 may control communication between base stations for cellular phone communication.

The speaker 104 emits an audio signal corresponding to audio data supplied from the voice processor 103.

The microphone 105 detects surrounding audio, and converts the detected audio into an audio signal. The audio signal may then be output to the voice processor 103 for further processing.

The voice processor 103 demodulates and/or decodes the audio data read from the memory 105, or audio data received by the wireless communication processor 102 and/or a short-distance wireless communication processor 107. Additionally, the voice processor 103 may decode audio signals obtained by the microphone 105.

The exemplary terminal device of FIG. 2 may also include a display 120, a touch panel 130, an operation key 140, and a short-distance communication processor 107 connected to an antenna 106.

The display 120 may be a Liquid Crystal Display (LCD), an organic electroluminescence display panel, or another display screen technology. In addition to displaying still and moving image data, the display 120 may display operational inputs, such as numbers or icons, which may be used for control of the terminal device 12. The display 120 may additionally display a graphical user interface such that a user may control aspects of the terminal device 12. Further, the display 120 may display characters and images received by the terminal device 12 and/or stored in the memory 150 or accessed from an external device on a network. For example, the terminal device 12 may access a network such as the Internet, and display text and/or images transmitted from a Web server.

The touch panel 130 may include a physical touch panel display screen and a touch panel driver. The touch panel 130 may include one or more touch sensors for detecting an input operation on an operation surface of touch panel display screen. Used herein, the phrasing "touch operation" refers to an input operation performed by touching an operation surface of the touch panel display with an instruction object, such as a finger or stylus-type instrument. In the case where a stylus, or the like, is used in a touch operation, the stylus may include a conductive material at least at the tip of the stylus such that the sensors included in the touch panel section 130 may detect when the stylus approaches/contacts the operation surface of the touch panel display (similar to the case in which a finger is used for the touch operation).

In certain aspects of the present disclosure, the touch panel 130 may be disposed adjacent to the display 120 (e.g., laminated), or may be formed integrally with the display 120. The touch panel 130 and the display 120 may be surrounded by a protective casing, which may also enclose the other elements included in the terminal device 12.

For simplicity, the present disclosure assumes the touch panel section 130 is a capacitance-type touch panel technology; however, it should be appreciated that aspects of the present disclosure may easily be applied to other touch panel types (e.g., resistance type touch panels) with alternate structures. In certain aspects of the present disclosure, the touch panel 130 may include transparent electrode touch sensors arranged in the X-Y direction on the surface of transparent sensor glass.

The touch panel driver may be included in the touch panel section 130 for control processing related to the touch panel section 130, such as scanning control. For example, the touch panel driver may scan each sensor in an electrostatic capacitance transparent electrode pattern in the X-direction and Y-direction and detect the electrostatic capacitance value of each sensor to determine when a touch operation is performed. The touch panel driver may output a coordinate and corresponding electrostatic capacitance value for each sensor. The touch panel driver may also output a sensor identifier that may be mapped to a coordinate on the touch panel display screen. Additionally, the touch panel driver and touch panel sensors may detect when an instruction object, such as a finger, is within a predetermined distance from an operation surface of the touch panel display screen. That is, the instruction object does not necessarily need to directly contact the operation surface of the touch panel display screen for touch sensors to detect the instruction object and perform processing described herein. Signals may be transmitted by the touch panel driver, e.g., in response to a detection of a touch operation, in response to a query from another element, based on timed data exchange, etc.

The operation key 140 may include one or more buttons or similar external control elements, which may generate an operation signal based on a detected input by the user. In addition to outputs from the touch panel 130, these operation signals may be supplied to the controller 160 for performing related processing and control. In certain aspects of the present disclosure, the processing and/or functions associated with external buttons and the like may be performed by the controller 160 in response to an input operation on the touch panel display screen rather than the external button, key, etc. In this way, external buttons on the terminal device 12 may be eliminated in lieu of performing inputs via touch operations, thereby improving water-tightness.

The antenna 106 may transmit/receive electromagnetic wave signals to/from other external apparatuses, and the short-distance wireless communication processor 107 may control the wireless communication performed between the other external apparatuses. Bluetooth, IEEE 802.11, and near-field communication (NFC) are non-limiting examples of wireless communication protocols that may be used for inter-device communication via the short-distance wireless communication processor 107.

Image data may be generated by the terminal device 12 via the camera 170, which may include an image sensor comprised of a Charge Coupled Device (CCD), Complementary Metal Oxide Semiconductor (CMOS), or the like. For example, an image signal may be generated by the camera 170 when an image formed on a light-receiving surface through a lens is photoelectrically converted. The lens of the camera 170 may, e.g., be arranged on a back surface of the terminal device 12 (i.e., opposite the display 120). The camera 170 may, in certain aspects of the present disclosure, include one or more processing circuits for performing processing features on still and/or moving image data (e.g., facial recognition). Additionally, the controller 160 may execute image processing on the still and/or moving image data.

In certain aspects of the present disclosure, digest videos may be generated by processing described herein using image data stored on server 20. For example, the terminal device 12 may download image data from the server 20, and the controller 160 may generate the digest video. In other aspects of the present disclosure, image data generated by the camera 170 and stored in the memory 150 may be used in the digest video generation processing described herein. In the case in which the controller 160 performs the digest video generation processing, the controller 160 may, e.g., download computer-readable instructions (e.g., software) from a network and/or a non-transitory computer-readable medium, store the instructions in the memory 150, and execute the instructions via the controller 160. In other aspects of the present disclosure, the server 20 may include processing circuitry that executes digest video generation processing described herein. In this case, a digest video may be generated using image data stored in a storage medium (e.g., memory(s) such as database 21) on the server 20 and/or downloaded by the server 20 from another external device connected on a shared network. Digest videos generated by the server 20 may then be viewed and/or downloaded by the other external devices connected on the shared network.

The terminal device 12 may include a motion sensor 108. The motion sensor 108 may detect features of a movement of the terminal device 12. For example, the motion sensor 108 may include an accelerometer, a gyroscope, a geomagnetic sensor, a geolocation sensor, etc. to detect motion of the terminal device 12.

Figure 3:
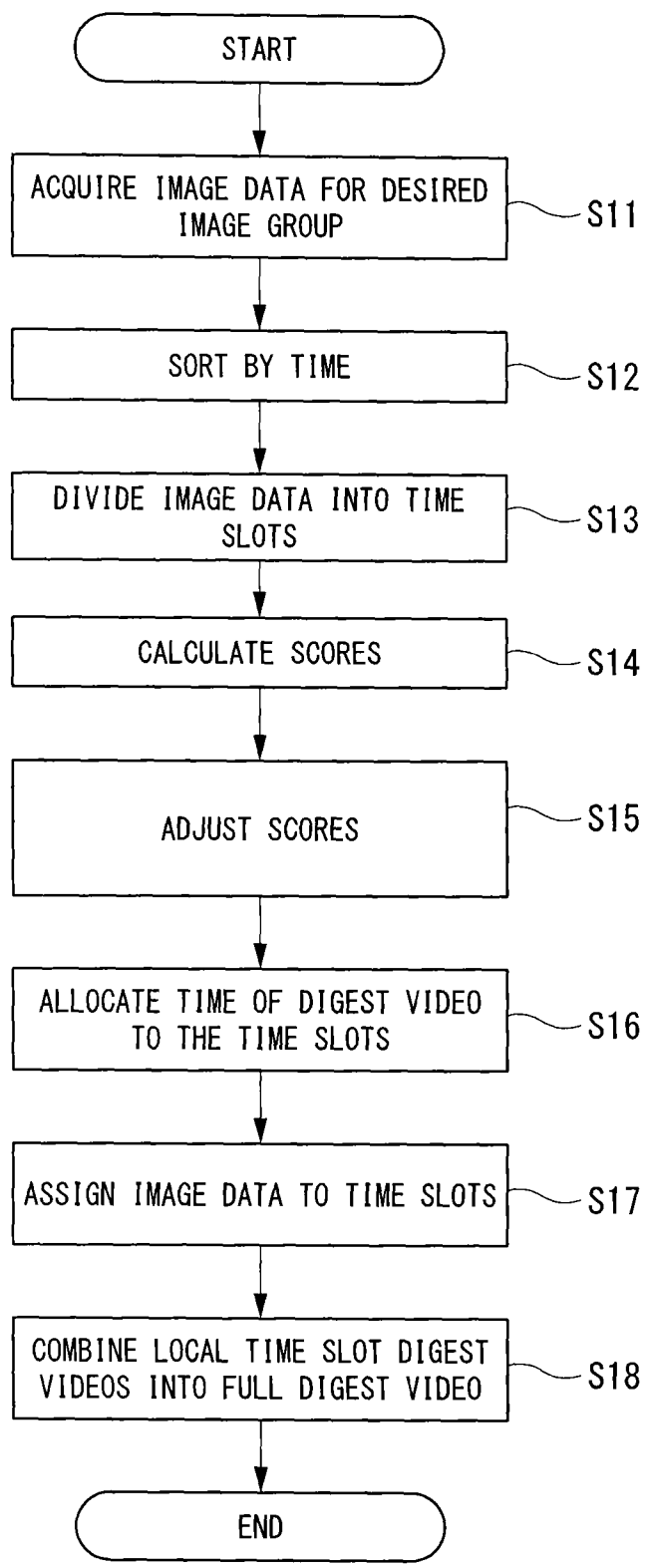
FIG. 3 illustrates an exemplary algorithmic flowchart for generating a digest video according to one aspect of the present disclosure.

Next, FIG. 3 illustrates an exemplary algorithmic flowchart for generating a digest video according to one aspect of the present disclosure. Although the case in which a terminal device such as terminal device 12 generates the digest video is explained in the example of FIG. 3, it should be appreciated that the same process may be adapted such that the server 20 or another processing device generates a digest video.

Referring now to FIG. 3, the controller 160 at step S11 acquires from the server 20 image data for a desired image group. For example, in certain aspects of the present disclosure, a user may enter text via an interface included with the terminal device 12 to send a search request including descriptive data used to search for one or more images stored in the server 20. For example, the user may enter a request to search for all image data associated with an event "A." In response to receiving the user's request, the controller 160 may acquire all image data from the server 20 associated with the event "A." In certain aspects of the present disclosure, the controller 160 and/or the server 20 may analyze metadata associated with some or all of the image data stored in the server 20 when determining whether image data corresponds to the user's request. In other words, the controller 160 and/or processing circuitry included in the server 20 may analyze individual images and their corresponding metadata, or alternatively may analyze file folders (or other similar filing structure units) of image data with corresponding labels (e.g., folders corresponding to an event, a place, a time, a user, content included in the image data, download/viewing frequency, user comments, popularity, etc.).

Next, the controller 160 at step S12 sorts the image data acquired at step S11 by time. For example, the controller 160 may analyze metadata associated with acquired image data to determine a date and/or a time at which the image data was captured. Based on the acquired date and/or time associated with each of the images included in the acquired image data, the controller 160 may create an ordering of the acquired image data, such as an ordered arrangement of the image data listed from the image data captured first to the image data captured last.

Next, the controller 160 at step S13 divides the sorted image data into time slots. For example, in certain aspects of the present disclosure, the controller 160 may determine, based on acquired metadata corresponding to the sorted image data, the earliest timestamp of the sorted image data and the latest timestamp of the sorted image data. Based on the earliest and latest timestamp, the controller 160 may determine a total time interval spanning the sorted image data. Based on the total time interval associated with the acquired image data, the controller 160 may divide the total time interval into a plurality of time slots, which may be equal in length or of varied lengths. For example, the controller 160 may determine that the acquired and sorted image data associated with the event "A" spans a total of 60 minutes. In response to determining the total time interval of 60 minutes for the event "A", the controller 160 may divide the total time interval of the event "A" into six equal time slots of 10 minutes each. The controller 160 may then, for example, analyze image data associated with a particular time slot based on the features of the image data in the time slot. For example, the controller 160 may analyze image data captured in the first 10 minutes (i.e., the first time slot) of the event "A", and perform similar processing for the remaining time slots. In the case in which image data such as moving video data spans across two time slots (e.g., a video captured at a time starting at T+8 minutes in event "A" and ending at T+15 minutes, thereby spanning across the first and second time slots), the controller 160 may, for the purposes of analyzing the image data, divide the image data spanning across the time slot at the point at which the time slot division occurs (e.g., at the 10-minute mark). Alternatively, the controller 160 may assign the video data to one of the time slots (e.g., the time slot in which the video data begins).

Next, the controller 160 calculates a time slot score for each time slot based on features of the image data corresponding to each respective time slot. In certain aspects of the present disclosure, the calculation of the time slot scores for each time slot may be performed using metadata associated with the image data. For example, the controller 160 may assign points to image data included in a particular time slot based on a recording length of the image data in the time slot. As another example, the controller 160 may assign points to a time slot based on a number of image files included in the time slot.

As a further example, in the case of moving video data, an average level of sound/voice in the video data may be assigned a point score for the time slot. In this example, an average sound level of the video data may be calculated or a minimum/maximum level of the sound data may be calculated, and points may be assigned to the time slot based on the average and/or minimum/maximum sound level in the video.

In certain aspects of the present disclosure, the controller 160 may perform image processing such that particular features of the raw image data may be extracted. For example, the controller 160 may perform image processing such that the controller 160 determines a number of faces included in a particular image.

As a further example, the controller 160 may perform the image processing such that the controller 160 determines an identity of one or more users included in the image data using facial recognition processing.

In certain aspects of the present disclosure, the controller 160 may calculate time slot scores based on a number of times the image data was accessed (e.g., viewed, downloaded, etc.) by external devices on the server 20.

Moreover, the controller 160 may assign points to a time slot based on a number of comments associated with image data. Further, the controller 160 may calculate a time slot score based on a qualitative or quantitative analysis of the comment data, e.g., by determining an affinity level for the image data by a user(s) that have viewed or otherwise accessed the image data. For example, the controller 160 may analyze metadata associated with image data corresponding to a numerical rating of image data and assign points to the time slot based on the rating of the image data within the time slot. As a further example, the controller 160 may determine whether certain key words or phrases are included in the comments (e.g., "love") and calculate scores for the image data when the words/phrases are detected.

In certain aspects of the present disclosure, the controller 160 may apply a weighting factor when calculating a time slot score. For example, the controller 160 may weight the time slot score such that one or more of the aforementioned examples of features used when calculating a time slot score may receive a higher priority. For example, a sound level may be determined to be of a higher importance to a user than a number of faces determined to be present in image data. In this case, the time slot score calculation may be weighted such that the determination of sound level receives a higher weight for the time slot than the score calculated for the number of faces determined to be in the image data for the time slot.

The controller 160 may add all the points calculated in the time slot score calculation such that a total time slot score for each time slot is determined. For example, the controller may sum the points calculated for determined sound level, video length, etc. to calculate a total score for each image data file, and sum the scores for each file in a time slot to calculate a total time slot score.

Next, the controller 160 at step S15 may adjust the total scores calculated for each time slot. For example, the controller 160 may compare the calculated total time slot scores for each time slot to a minimum threshold value and a maximum threshold value. When the time slot score for a time slot falls outside the range bounded by the minimum and maximum threshold values, the controller 160 may adjust the time slot score such that the score falls within the allowable range. Alternatively, the controller 160 may apply an adjustment factor to the time slot scores such that the time slot scores fall within the minimum and maximum threshold value range. For example, the time slot score in one or more time slots may be multiplied by a correction factor to raise/lower the scores. As a further example, a correction factor may be added to the time slot score, e.g., to increase the time slot score above the minimum threshold. The adjustment performed at step S15 by the controller 160 provides the benefit of preventing any one time slot from being overrepresented or underrepresented in the generated digest video.

Next, the controller 160 at step S16 allocates time of the digest video to the individual time slots. In certain aspects of the present disclosure, the controller 160 may calculate a score ratio representing the score of each of the individual time slots with respect to the total score of all the time slots. Based on the score ratio, the controller 160 may allocate a portion of the duration of the digest video to the image data included in each of the individual time slots. For example, if the controller 160 determines that all time slots associated with event "A" have a total score of 10, and the controller 160 calculates an individual time slot score of 4 for time slot 1, the controller 160 calculates a score ratio for time slot 1 of 4:10 (i.e., 0.4). In this case, the image data included in the time slot 1 is allocated 40% of the duration of the digest video to be generated from the image data.

Next, the controller 160 at step S17 assigns image data included in the individual time slots to local digest videos corresponding to the individual time slots, based on the score ratio calculated in step S16. For example, in certain aspects of the present disclosure, the controller 160 may determine which of the images associated with a particular time slot may be included in the local digest video generated for the particular time slot. In other words, the controller 160 may select image files associated with a particular time slot and/or image segments of the image files associated with the particular time slot and generate the local digest video such that the local digest video spans the time allocated to the time slot from step S16. Further details associated with generating local digest videos based on features of image data associated a particular time slot will be discussed in further detail at least with respect to the example of FIG. 4.

Next, the controller 160 at step S18 combines the local time slot digest videos generated at step S17 to form a complete digest video associated with the event. In other words, the controller 160 at step S18 connects the local time slot digest videos representing image data associated with each of the individual time slots associated with a portion of the event, and connects the individual local digest videos to form a complete digest video representing the entire event.

Figure 4:
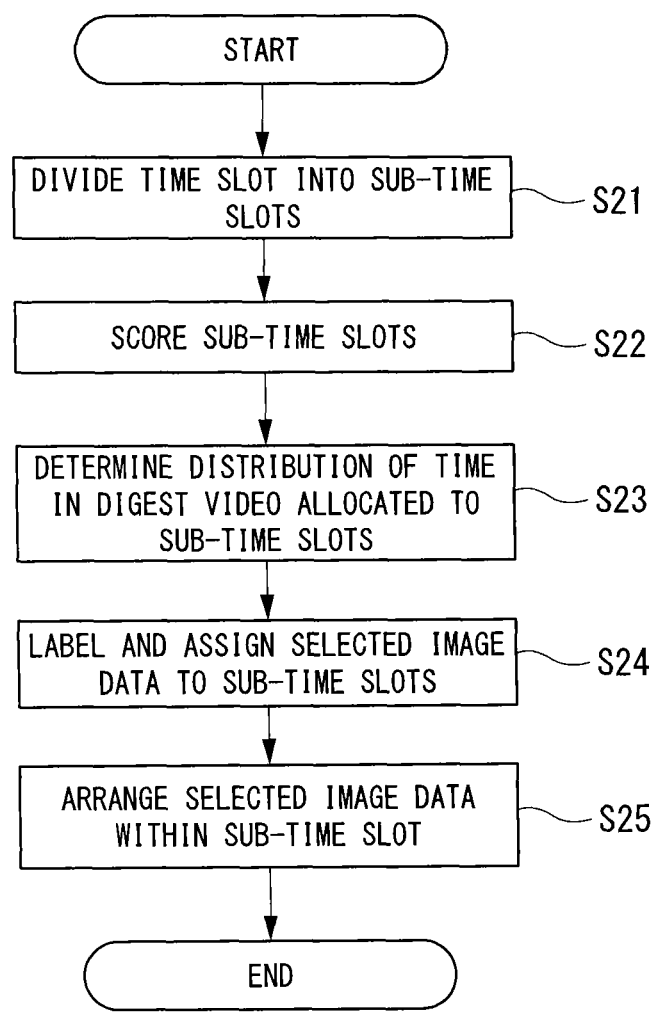
FIG. 4 illustrates an exemplary algorithmic flowchart for generating a local digest video within a single time slot according to one aspect of the present disclosure.

Next, FIG. 4 illustrates an exemplary algorithm flowchart for generating a local digest video corresponding to a single time slot according to one aspect of the present disclosure. In certain aspects of the present disclosure, the flowchart of FIG. 4 illustrates a detailed example of the process of assigning image data to a time slot to generate a local digest video as in the processing described above for step S17 in FIG. 3.

Referring now to FIG. 4, the controller 160 at step S21 divides each of the time slots associated with the sorted image data acquired from the server 20 into a plurality of sub-time slots. For example, in the case discussed above in which each of the time slots corresponds to 10 minutes of image data for a particular event, the controller 160 at step S21 may divide each of the 10 minute time slots, e.g., into 5 sub-time slots of 2 minutes each.

Next, the controller 160 at step S22 generates a sub-time slot score for each of the plurality of sub-time slots associated with the plurality of time slots. In certain aspects of the present disclosure, the controller 160 may score the image data included in the sub-time slots based on the metadata associated with the image data. In other aspects of the present disclosure, the controller 160 may perform image processing to detect features within the raw image data to generate the score for the sub-time slot. The process of generating sub-time slot scores in step S22 may, in certain aspects of the present disclosure, be the same process of said process discussed above for step S14 in FIG. 3. Alternatively, the controller 160 may calculate sub-time slot scores based on different conditions from those discussed above in step S14. Following the calculation of points by the controller 160 for each of the sub-time slots based on the metadata features and/or image features of the image data associated with the sub-time slots, the controller 160 sums the total points for each of the sub-time slots to determine a total sub-time slot score for each sub-time slot. A sub-time slot score ratio may then be calculated by the controller 160, whereby the sub-time slot score ratio represents the proportion of any particular sub-time slot score with respect to the sum of the sub-time slot scores for a particular time slot. For example, in the case of the 5 sub-time slots associated with time slot 1 in the example discussed above for the image data associated with event "A", the controller 160 may calculate that the sum of the 5 sub-time slot scores equals 20, and the sub-time slot score for the third sub-time slot equals 5. In this case, the sub-time slot score ratio for sub-time slot 3 would be 5:20 (0.25).

Next, the controller 160 at step S23 determines the time of the total time allocated to the digest video that is to be allocated to each of the sub-time slots. In certain aspects of the present disclosure, the controller 160 may determine the distribution of time allocated to the sub-time slots based on the sub-time slot score ratio calculated at step S22. In the example discussed above in which the sub-time slot 3 has a score ratio of 5:20, the controller 160 at step S23 may determine that sub-time slot 3 should receive a 25% allocation of the time available in the local digest video for time slot 1. In other aspects of the present disclosure, the controller 160 may determine an allocation of a number of image files allocated to the sub-time slot. At this time, the controller 160 may also determine that an amount of image data allocated to a particular sub-time slot should equal zero, e.g., if the importance of the sub-time slot is determined to be low. For example, following the calculation of the sub-time slot scores, the controller 160 may determine that a sub-time slot score for a particular time slot is below a minimum threshold value. In this case, the controller 160 may determine that image data corresponding to the sub-time slot having the sub-time slot score falling below the minimum threshold value should be excluded from the allocation of time within the time slot period.

Next, the controller 160 at step S24 assigns selected image data included within the sub-time slot as image data which is to be included in the local digest video for a given time slot. For example, the controller 160 may analyze a plurality of image data files associated with a given sub-time slot. In this case, the controller 160 may analyze the scores calculated in the above sub-time slot score calculation processing to determine an ordering/ranking of the image data files corresponding to the sub-time slot. The controller 160 may then assign, based on the determined ordering/ranking of the image data files, selected image data files to be included in the local digest video for the time slot such that the assigned image data is within the allocated time in the full digest video for the time slot.

Next, the controller 160 at step S25 arranges and/or ranks the image data files assigned above in step S24. Step S25 may also include labeling image data files within the time slot. An example of labeling will be illustrated later in FIG. 10. In certain aspects of the present disclosure, the controller 160 may give higher priority to the image data files having a higher sub-time slot score. For example, when the controller 160 determines at step S25 that image data files have a higher relative sub-time slot score than the other selected image data files in the sub-time slot, the controller 160 may give the high scoring image data a higher priority and therefore, e.g., arrange the image data in the sub-time slot such that the highest scoring image data is displayed first in the local digest video.

Next, the controller 160 at step S26 distributes the chosen image data files to the local digest videos such that the individual image data files may be connected to form the local digest video for a given time slot. Once the image data files are connected to form the local digest video for a given time slot, the controller 160 may then output the local digest video and/or further process the local digest video, for example, by connecting other local digest videos for subsequent time slots to form a complete digest video, e.g., for a given event such as event "A".

Figure 5:
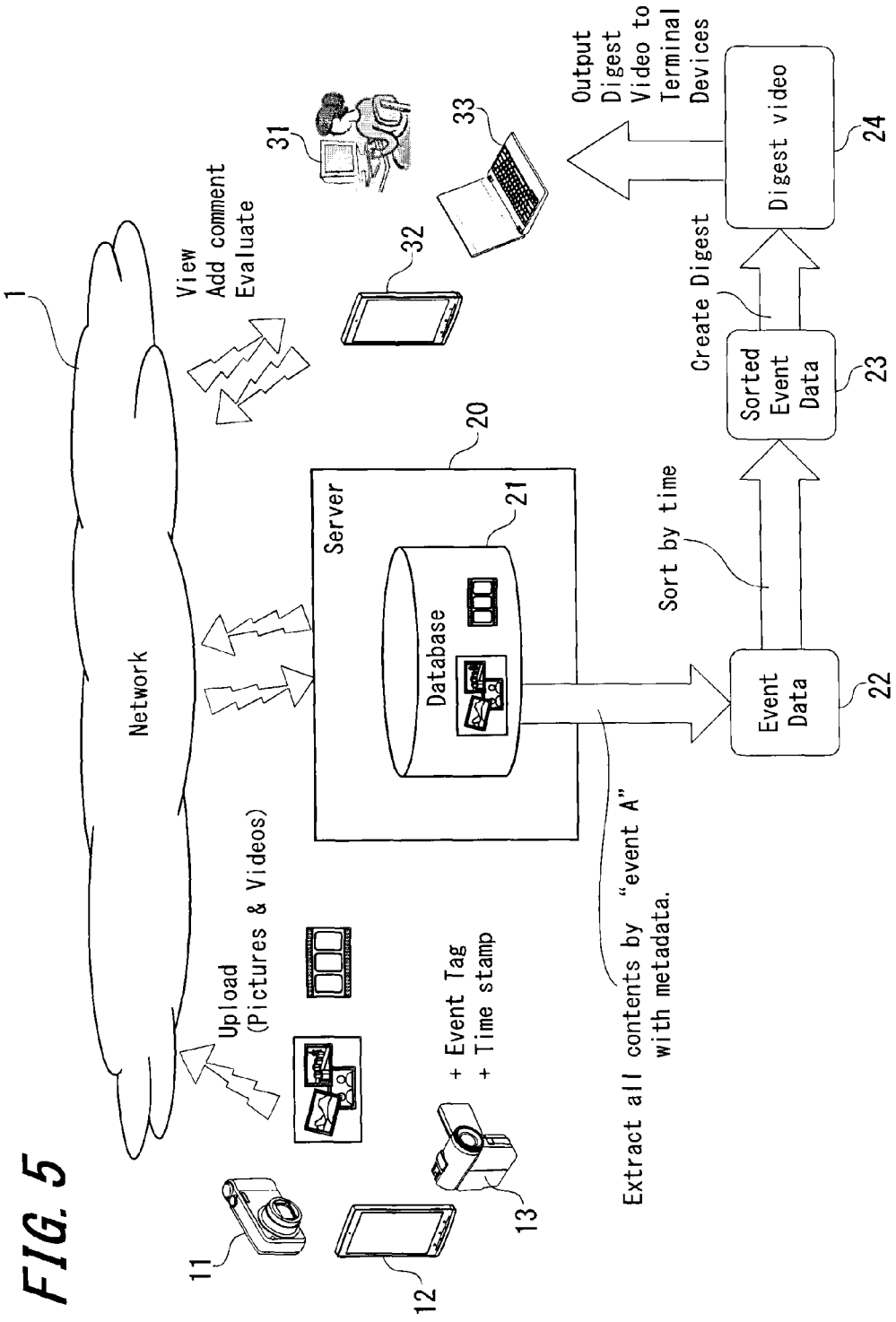
FIG. 5 illustrates an exemplary system overview in a case where a server generates a digest video according to one aspect of the present disclosure.

Next, FIG. 5 illustrates an exemplary system overview in which a server embodies a digest video generation apparatus. Specifically, the example of FIG. 5 illustrates a case in which the server 20 performs digest video generation processing such as that described in preceding examples. According to the example illustrated in FIG. 5, the server 20 acquires image data corresponding to a request for acquiring image data having particular features. For example, the server 20 may acquire image data stored in the database 21, whereby the image data acquired by the server 20 corresponds to a particular event such as the event "A" described above in preceding examples. In this case, image data may include metadata whereby processing circuitry included in the server 20 may determine that the image data stored in the database 21 corresponds to the event "A". For example, the processing circuitry included in the server 20 may analyze metadata associated with the image data stored in the database 21 to determine that the image data title, description, related comments, geospatial location, time, etc., correspond to information relating to the event "A". In the case in which time is utilized as a search criterion, the server 20 may analyze metadata associated with the image data stored in the database 21 to match the time of a particular event with a timestamp of corresponding image data.

In the example of acquiring image data corresponding to a particular event in the illustration of FIG. 5, the acquired image data corresponding to the event "A" is extracted as event data 22. The image data included in the event data 22 is analyzed by the processing circuitry included in the server 20 to determine a timestamp for each of the image data files included in the image data. Based on the timestamp data of the event data 22, the processing circuitry of the server 20 sorts the event data 22 based on time. For example, the event data 22 may be sorted based on increasing time from a start point of an initial image. The sorted event data is stored in the server 20 as event data 23. The processing circuitry of the server 20 may then execute digest video generation processing on the event data 23 to create the digest video 24. In certain aspects of the present disclosure, the server 20 executes digest video generation processing similar to that described above in FIGS. 3 and 4 to generate a digest video. The digest video 24 may be stored on the server 20, in which case the generated digest video 24 may be accessed (e.g., downloaded, viewed, etc.) via the network 1 by external devices such as terminal devices 11, 12, 13, 31, 32, and 33.

Figure 6:
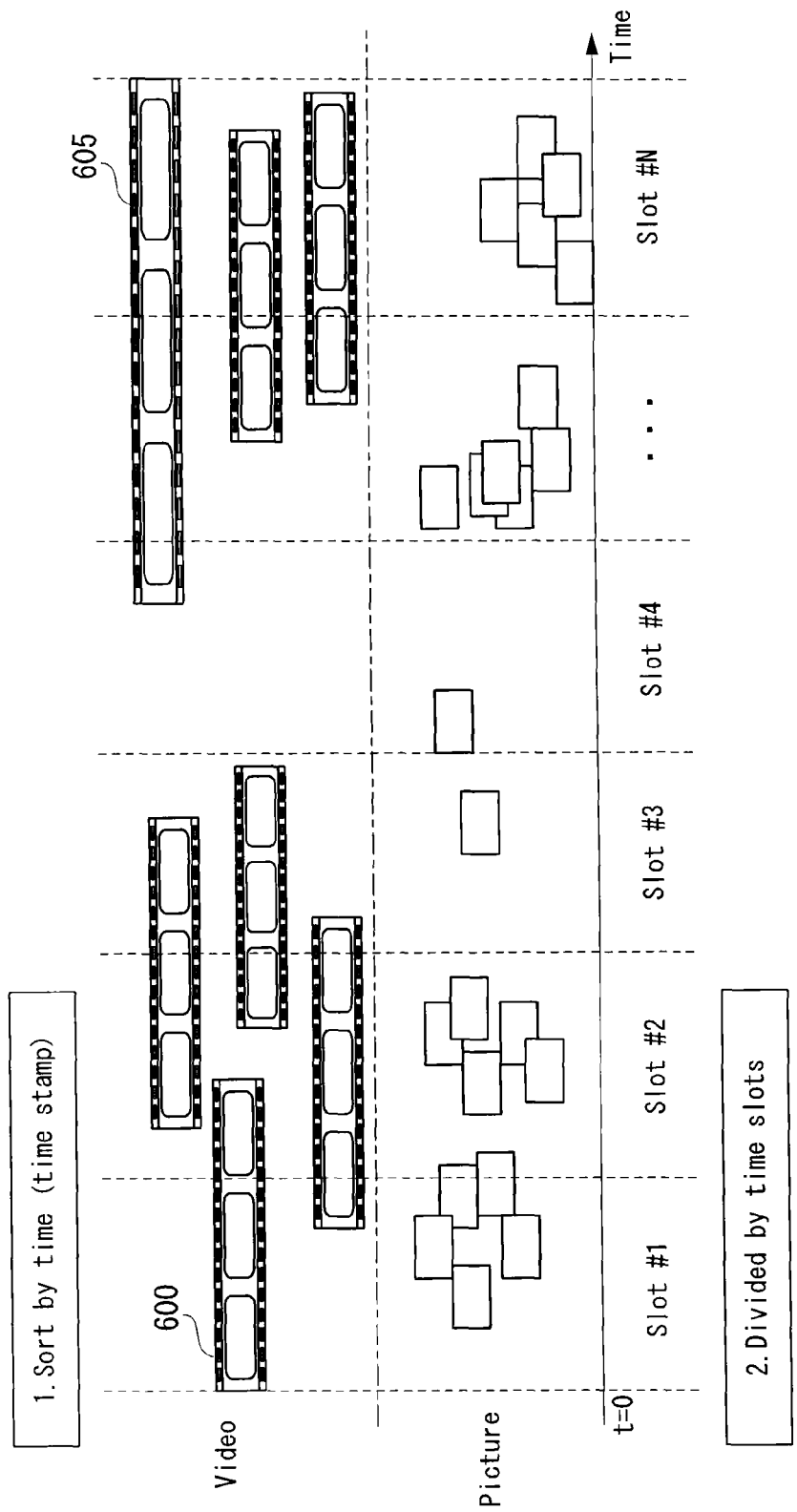
FIG. 6 illustrates an example of sorting image data based on time and dividing the sorted image data into time slots according to one aspect of the present disclosure.

Next, FIG. 6 illustrates an example of determining time slots according to one aspect of the present disclosure. Referring to the figure, the controller 160, according to the example of FIG. 6, may acquire a plurality of image data files, e.g., from the server 20. The controller 160 may analyze the acquired image data files and determine a timestamp based on metadata corresponding to each of the respective image data files. Based on the timestamp data, the controller 160 may order each of the received image data files based on the timestamp. Referring to the exemplary illustration of FIG. 6, the controller 160 may, in certain aspects of the present disclosure, obtain image data corresponding to a particular event such as the event "A". The controller 160 may analyze the metadata for the image data corresponding to the event "A" and determine timestamps for each of the image data files. Based on the timestamps, the controller 160 may order each of the image data files based on the time at which the image data was captured, as indicated by the timestamp. In the case of moving video data, the controller 160 may use the start points of the moving video image data when ordering the image data. In the case that still images are received as image data, the controller 160 may order the image data according to the time at which the still images were captured. In the case that both moving videos and still images are acquired as image data, the controller 160 may order a combination of the moving video and the still image data according to the time, as illustrated in FIG. 6.

After analyzing the timestamp data for each of the image files received in the image data for a given event, the controller 160 may determine a total time interval of the received image data. For example, the controller 160 may determine based on the timestamp data the earliest time at which image data corresponding to the given event was captured and the time at which the last image file of the image data ends. In the example shown in FIG. 6, a moving video image data file 600 is shown as having the earliest timestamp beginning at t=0. A moving video image data file 605 is shown as having the latest endpoint of the acquired image data. Thus, the controller 160 may determine that the total time interval represented by the image shown in FIG. 6 begins at the start point of the image data 600 and ends at the endpoint of the image data 605. Based on the total calculated time interval of the image data, the controller 160 may divide the total time interval into a plurality of time slots. The example of FIG. 6 illustrates the controller 160 dividing the total time interval represented by the event "A" into time slots #1 through #N.

As illustrated in the example at FIG. 6, image data corresponding to the event "A" may be represented as falling into one or more of the time slots determined by the controller 160. In this way, image data acquired by the controller 160 may be analyzed based on its features, and a score may be calculated for the image data corresponding to each respective time slot.

As shown in FIG. 6, image data may span across multiple time slots. In certain aspects of the present disclosure, the controller 160 may divide the image data spanning across time slots at the point corresponding to the time slot division (i.e. the time corresponding to the division point). In other aspects of the present disclosure, the controller 160 may alternatively assign image data to a time slot based on the start/end time of the image data. That is, the controller 160, rather than dividing image data, may analyze the timestamp data of each of the image data files and determine that each of the image data files corresponds to the time slot in which the image data capture began/ended. A number of time slots into which the controller 160 divides the total time interval of acquired image may be selected arbitrarily, may be a predetermined number, or may be based on a predetermined function.

Figure 7:
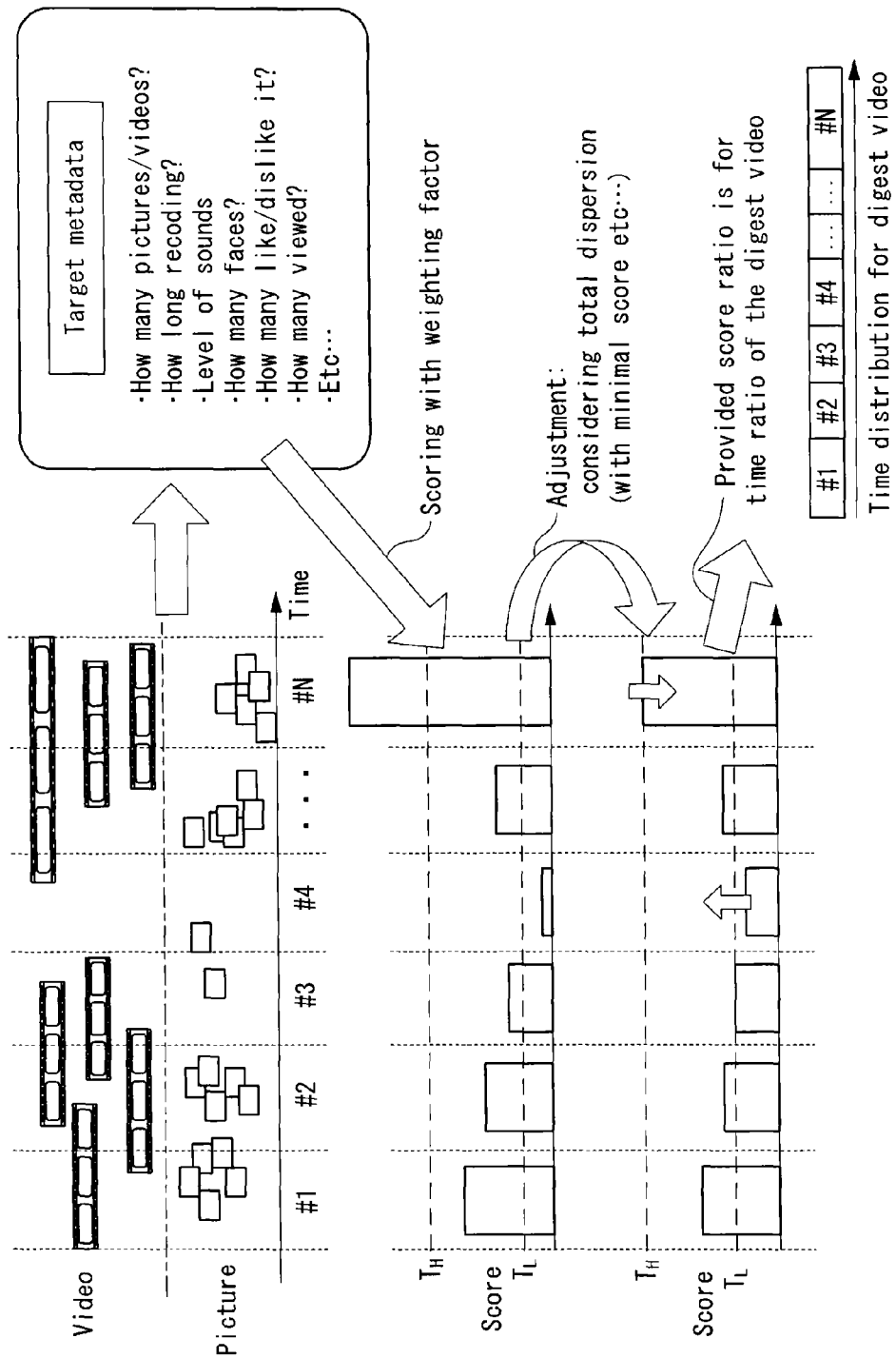
FIG. 7 illustrates an example of calculating a time slot score according to one aspect of the present disclosure.

Next, FIG. 7 provides an illustrative example of calculating a time slot score for a plurality of time slots based on features of acquired image data according to one aspect of the present disclosure. Referring to FIG. 7, the controller 160, according to certain aspects of the present disclosure, calculates a time slot score for each of the time slots #1 to #N illustrated in the figure. According to certain aspects of the present disclosure, the controller 160 may calculate the time slot score based on features of image data corresponding to each respective time slot. As discussed in previous examples, the controller 160 may assign points to image data within a time slot based on a number of pictures included within the time slot, a length of time of the image data within the time slot, a sound level of image data within the time slot, received comments representing a user's affinity for image data within the time slot, a number of times the image data was viewed by an external device, a number of times the image data was downloaded, and the number of faces included in the image data corresponding to the time slot. Time slot scores may also be calculated based on a quantity of image data included in a time slot (e.g., a number of image data files). The skilled artisan will appreciate that other features of the image data may be utilized to calculate a score, and the above list is provided merely for illustration purposes and should not be construed as limiting. Moreover, any one feature of the acquired image data such as the data included in the image data's metadata and/or the image features determined by image processing analysis may be utilized in the score calculation either individually or in combination. That is, the controller 160 may calculate scores based on one or more features of the image data for each time slot.

Individual scores for each image data file included within a time slot may be summed by the controller 160 such that a total time slot score for each time slot is calculated. For example, the controller 160 may calculate a score for each of the image data files included within the time slot #1 and add all of the individual image data file scores to form a total time slot score of the time slot #1. As discussed in previous examples, the controller 160 may apply a weighting factor to each of the image data files based on an importance of one or more of the particular features of the image data file with respect to the other features. The controller 160 continues the calculation of a total time slot score for each of the remaining time slots in the time interval represented by the acquired image data.

In certain aspects of the present disclosure, the controller 160 may analyze the time slot score for each of the time slots to determine whether the time slot score falls within a range bounded by a minimum threshold value and a maximum threshold value. The example of FIG. 7 illustrates a maximum threshold value in a graph shown as threshold $T_H$ and a lower threshold value represented by $T_L$. As discussed in previous examples, the minimum and maximum threshold values may be selected such that the controller 160 does not score time slots in such a way that any particular time slot is overrepresented or underrepresented in the generation of the digest video.

Based on a comparison of each of the time slot scores with the minimum and maximum threshold values, the controller 160 may, in certain aspects of the present disclosure, adjust the time slot scores such that the time slot scores fall within the range bounded by the minimum and maximum threshold values. For example, the controller 160 may add a predetermined value or multiply by a predetermined correction factor in order for the adjustment of the scores to fall within the range.

The skilled artisan will appreciate that one or both of the minimum and maximum threshold values may be omitted from the score adjustment discussed above. For example, the controller 160 may compare the time slot scores for each of the time slots only to a maximum threshold value, whereby only an adjustment of the time slot scores below the maximum threshold value would be performed. As a further example, the controller 160 may determine whether the time slot scores fall only below a minimum threshold value. In this case, the controller 160 may, in certain aspects of the present disclosure omit image data corresponding to the time slot falling below the minimum threshold value from being used to generate the digest video.

The bottom graph illustrated in FIG. 7 illustrates the time slot scores following the adjustment of time slot scores within the minimum and maximum threshold value range. After the controller 160 adjusts the time slot scores for each of time slots to fall within the minimum and maximum threshold value range, the controller 160 may then calculate a score ratio for each of the time slots. As discussed in previous examples, the score ratio may be represented by a time slot score for each of the time slots with respect to all of the other time slots (e.g. the sum of all of the individual time slot scores).

Based on the calculated score ratio, the controller 160 may then determine an allocation of time for each of time slots to the digest video. For example, the time slot having the highest score ratio, as calculated by the controller 160, may be allocated the highest proportion of time within the digest video. In the example of FIG. 7, the time slot #N is shown as having the highest time slot score and therefore, the time slot #N is provided with the highest proportion of the total time within the digest video. Similarly, the time slot #4 is shown as having the lowest time slot score with respect to the other time slots shown in FIG. 7. Therefore, the time slot #4 may be allocated the lowest time distribution within the digest video. If the total time allocated to the digest video is known, the controller 160 may calculate the specific time allocated to each of the time slots based on the score ratio at this time. The specific time allocated to each of the time slots may then be used as a basis for allocating image data to form local digest videos, as discussed in later examples. As a non-limiting example of allocating a specific time to each of the time slots, if the total length of the digest video to be generated is known to be three minutes, the three minutes allocated to the full digest video may be proportionally divided (e.g., based on time slot score ratio) amongst each of the time slots. For example, the score ratio may be represented as a number between 0 and 1, and the value of the time slot score ratio may be multiplied by the total time allocated to the digest video to determine the specific time allocated to each of the individual time slots (i.e., the local digest video) within the digest video. An exemplary graphical representation of the time distribution for a digest video, whereby the size of each time slot distribution is proportional to the slot's score ratio, is provided in FIG. 7.

Figure 8:
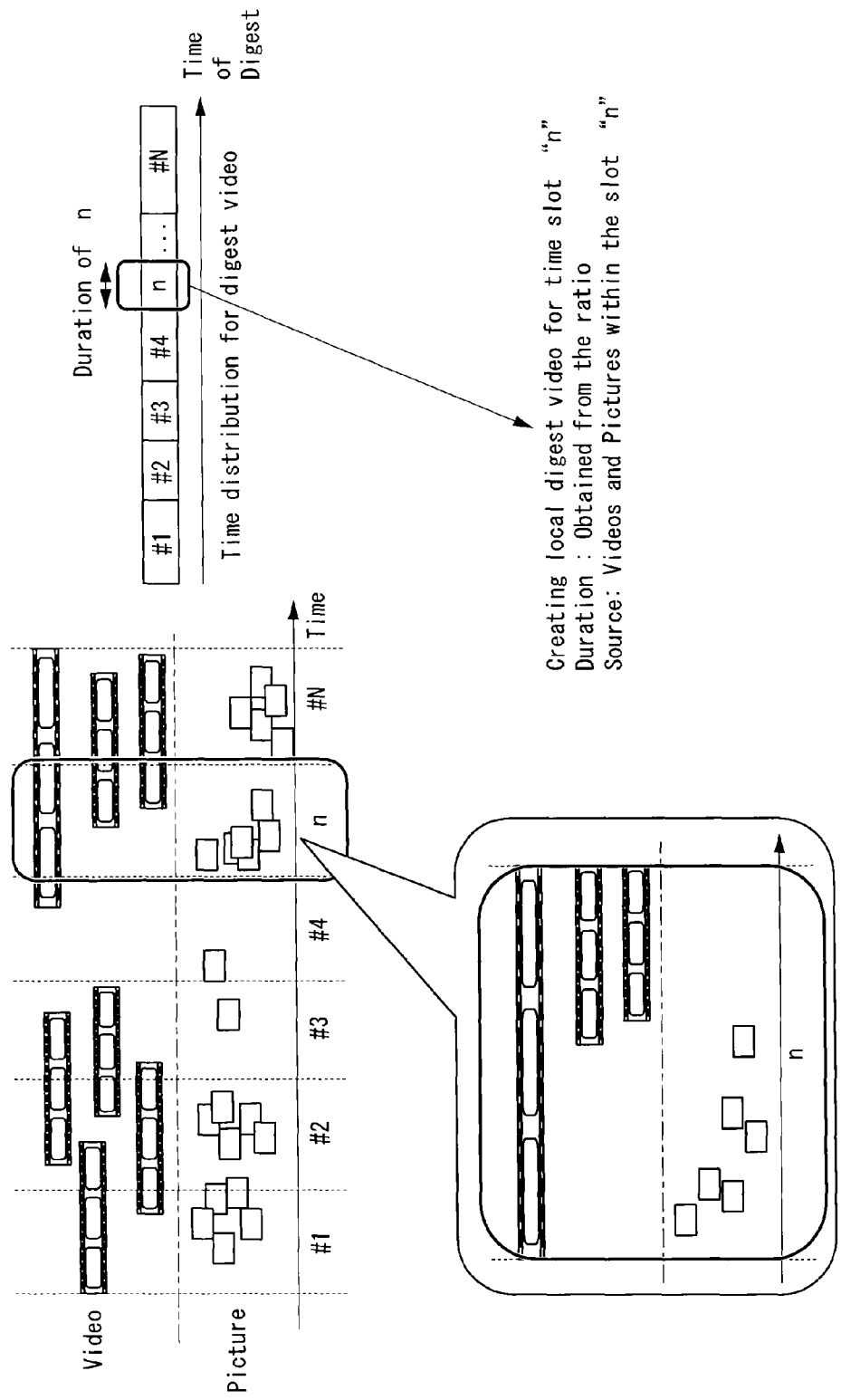
FIG. 8 illustrates an example of generating a local digest video within a single time slot according to one aspect of the present disclosure.

Next, FIG. 8 illustrates an example of allocating image data in a single time slot to form a local digest video corresponding to the time slot according to one aspect of the present disclosure. The illustrative example of FIG. 8 assumes that a local digest video will be generated corresponding to the time slot "n". In certain aspects of the present disclosure, the time allocated for a local digest video corresponding to time slot n is determined based on the score ratio calculated for the time slot n. In this example, the source of videos and still picture image data within the time slot n provides the source of image data used when generating the local digest video for the time slot n.

The moving video data and still image data in the time slot n are arranged based on time, and the controller 160 divides the time slot n into a plurality of sub-time slots. For example, the image data included within the time slot n from the image data received by the controller 160 in response to a search request, e.g., for image data corresponding to an event "A", is shown in FIG. 8. Based on the duration of the digest video allocated to the time slot n (e.g., based on the score ratio of the time slot n), image data included within the time slot n may be assigned to the local digest video corresponding to time slot n.

Figure 9:
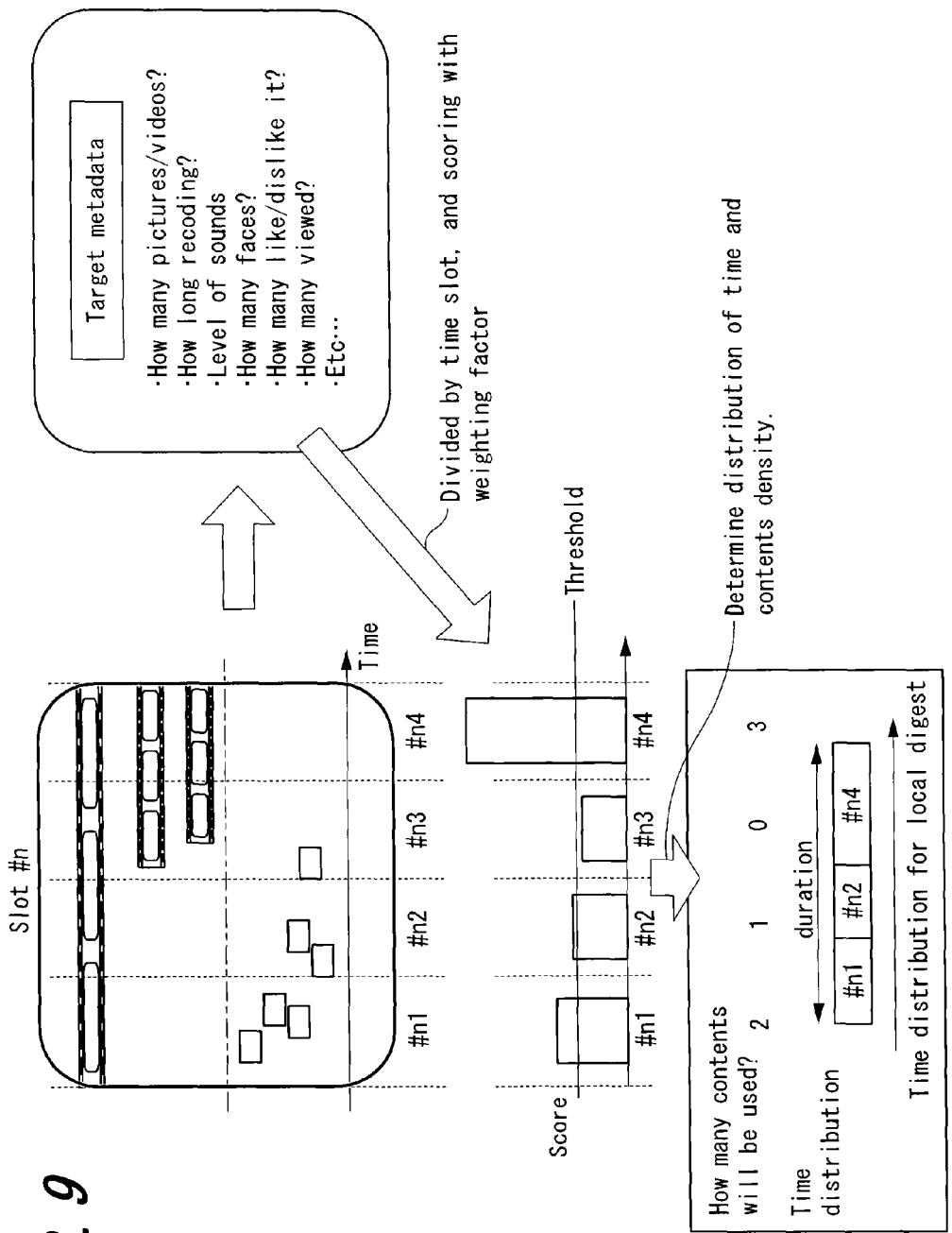
FIG. 9 illustrates an example of dividing a time slot into sub-time slots and calculating sub-time slot scores according to one aspect of the present disclosure.

Next, FIG. 9 illustrates an example of calculating a sub-time slot score for a given time slot and assigning image data corresponding to each of a plurality of sub-time slots to generate a local digest video based on the sub-time slot score according to one aspect of the present disclosure.

Referring to the example of FIG. 9, the time slot #n is divided into four time slots #n1, #n2, #n3, and #n4. Similar to the case in which image data associated with a time slot is evaluated to determine a time slot score, the controller 160 may determine which of the image data of the time slot #n corresponds to each of the time slots #n1 through #n4, and calculate a sub-time slot score based on features of the corresponding image data for each sub-time slot. As in the case for time slot image data processing discussed in previous examples, the controller 160 may, in the case in which image data in a time slot spans across multiple sub-time slots, divide the image data spanning across the multiple sub-time slots into each of the respective sub-time slots at the division point. Alternatively, the controller 160 may, in certain aspects of the present disclosure, assign image data to each of the sub-time slots based on a timestamp indication of when the image data starts, finishes, etc.

Based on features of the image data, such as metadata associated with the image data corresponding to each of the sub-time slots and/or image features derived by image processing performed by the controller 160, the controller 160 may assign a score to each of the image data files associated with each of the sub-time slots illustrated in FIG. 9. For example, the controller 160 may assign points to each of the image data files associated with each of the sub-time slots in FIG. 9 based on a number of pictures/videos included within the sub-time slot, a length of each of the recordings included within the sub-time slot, a level of sound for each of the image data files within the sub-time slot, a number of faces included in image data for each of the image data files in the sub-time slot, an indication of a user's affinity for each of the image data files within the sub-time slot (e.g. based on comments received on a social network), a number of views of each of the image data files included within the sub-time slot, a number of downloads of each of the image data files included within the sub-time slots (e.g. a number of times each of the image data files is downloaded from a server to an external terminal device via a network), etc. The controller 160 may then sum each of the individual image data file scores to form a sub-time slot score for each of the sub-time slots #n1 through #n4. As in previous examples, the controller 160 may apply a weighting factor to the sub-time slot scores such that one or more features of the image data is given a higher priority when calculating the sub-time slot score.

Following the calculation of the sub-time slot scores for each of the sub-time slots, the controller 160 may, in certain aspects of the present disclosure, compare the sub-time slot scores for each of the sub-time slots to a threshold value. For example, the threshold value may correspond to a minimum threshold value for which the controller 160 will assign image data associated with the sub-time slot to the local digest video for the time slot. In the example shown in FIG. 9, the controller 160 compares the four sub-time slot scores calculated for the slot #n and determines that the sub-time slot #n3 falls below the minimum threshold value. In response to determining the sub-time slot score for the sub-time slot #n3 falls below the minimum threshold value, the controller 160 may exclude the image data associated with the sub-time slot #n3 from being assigned to the local digest video generated for the time slot #n.

Following the comparison to the threshold value, the controller 160 may determine an allocation of time and/or contents to the local digest video generated for a given time slot. For example, according to the example of FIG. 9, image data contents from sub-time slots #n1, #n2, and #n4 may be allocated to the local digest video corresponding to time slot #n because the sub-time slot scores for each of these sub-time slots are above the minimum threshold value. The controller 160 may calculate a sub-time slot score ratio for the sub-time slots having sub-time slot scores above the minimum threshold value. Based on the sub-time slot score ratio, the controller 160 may determine, for example, a duration of time allocated for each of the sub-time slots to the local digest video corresponding to the time slot. In other aspects of the present disclosure, the controller 160 may determine a number of image data files to be assigned to the local digest video for each of the sub-time slots.

Referring to the example of FIG. 9, based on the score ratio calculated for time slot #n, the controller 160 determines that sub-time slot #n1 should be allocated two image data files to the local digest video, the sub-time slot #n2 should be allocated one image data file to the local digest video, the sub-time slot #n3 should be allocated zero image data files to the local digest video, and the sub-time slot #n4 should be allocated three image data files to the local digest video for time slot #n. Alternatively, the controller 160 may determine a duration of time allocated to each of the sub-time slots for the local digest video generated for time slot #n. In the example of FIG. 9, the sub-time slot #n4 is allocated the highest distribution of time and/or contents within the local digest video for time slot #n because the sub-time slot score for sub-time slot n4 is higher than the sub-time slot scores of sub-time slots #n1 and #n2.

Figure 10:
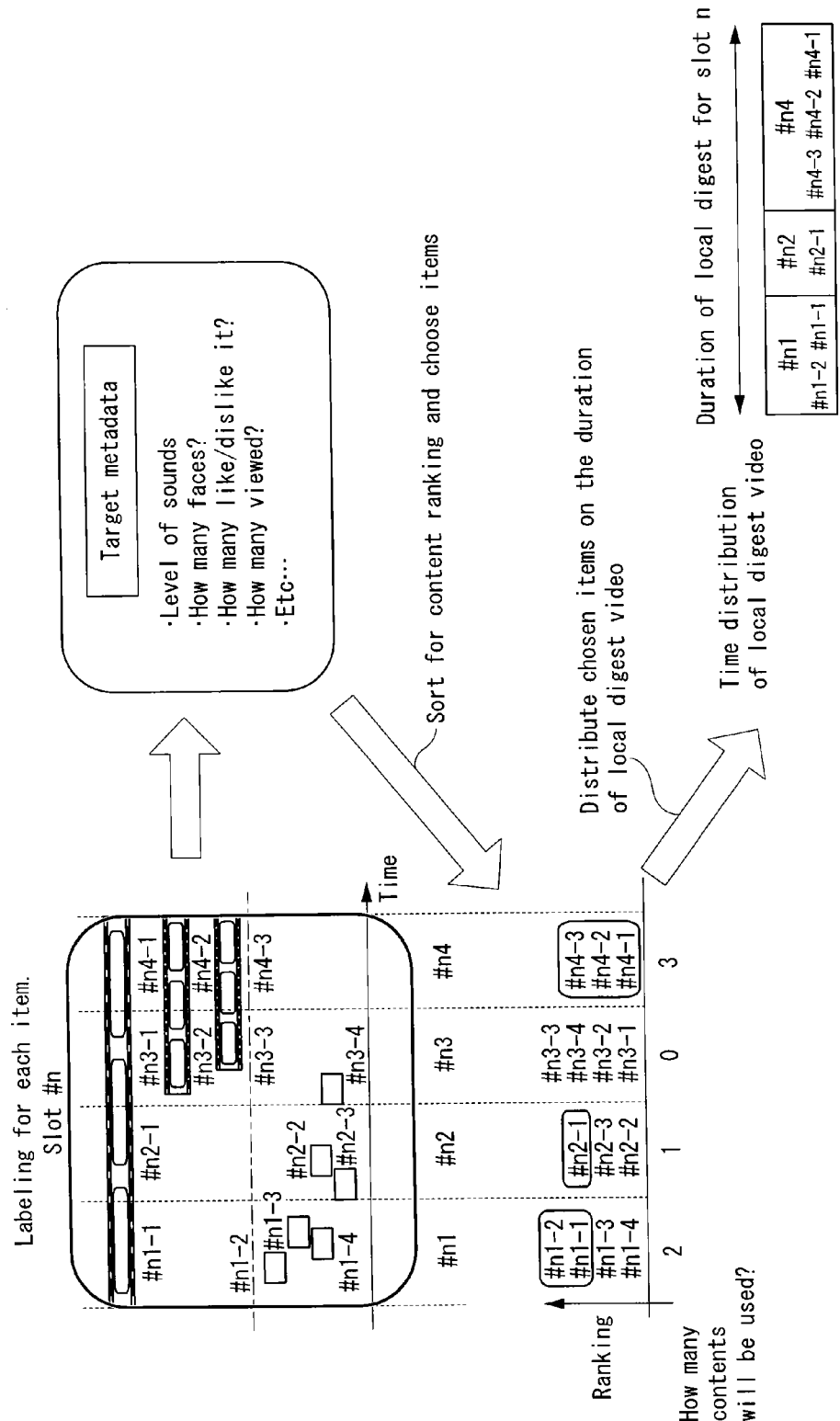
FIG. 10 illustrates an example of assigning image data to a local digest video according to one aspect of the present disclosure.

Next, FIG. 10 illustrates an example of assigning image data included within a sub-time slot to form a local digest video according to one aspect of the present disclosure. The example illustrated in FIG. 10 assumes the controller 160 determines a number of image data files associated with a sub-time slot that should be assigned to the sub-time slot when generating the local digest video. However, it should be appreciated that the controller 160 may determine a time duration of image data included within a sub-time slot to be assigned to generate the local digest video. For example, in the case in which moving video data is associated with the sub-time slot, the controller 160 may determine that a segment from one or more of the moving video image data files should be assigned to the sub-time slot when generating the local digest video. As another example, the controller 160 may determine that a number of full-length videos should be assigned to the local digest video such that the sum of the individual segment durations is less than or equal to the allocated time duration of the local digest video.

Referring now to the example illustrated in FIG. 10, the controller 160 determines a number of image data files to be assigned to each of the sub-time slots based on the sub-time slot score ratio discussed above at least with respect to FIG. 9. In certain aspects of the present disclosure, the controller 160 may label the image data files included in each of the respective sub-time slots. For example, referring to sub-time slot #n1 shown in FIG. 10, the controller 160 may label each of the four image data files associated with the sub-time slot #n1 as #n1-1, #n1-2, #n1-3, and #n1-4. The controller 160 may perform similar labeling for each of the remaining sub-time slots shown in FIG. 10.

Based on the score ratio calculation discussed above for FIG. 9, the controller 160 determines that the sub-time slots #n1 through #n4 should respectively be assigned image data files of a quantity of 2, 1, 0, and 3. Using this content allocation as an upper limit baseline for assigning image data for files to each of the sub-time slots when generating a local digest video, the controller 160 may determine, for each of the sub-time slots in the time slot #n, a ranking of the image data files included within the sub-time slot. For example, the controller 160 may determine an ordered ranking of points of sub-time slot point scores for each of the four sub-time slot #n1 image data files. In the specific non-limiting example of FIG. 10, the controller 160 may determine that data file #n1-2 has the highest point total and image data file #n1-1 has the second highest point total from the calculation of the sub-time slot score. As a result, the controller 160 may determine that the two image data files having the highest point total score in the sub-time slot #n1 should be assigned to the local digest video. Similarly, the controller 160 may determine for sub-time slot #n2 that image data file #n2-1 has the highest point total from the calculation of the sub-time slot score for sub-time slot #n2. As a result, the controller 160 may assign image data file #n2-1 to the local digest video allocation for the sub-time slot #n2. In the exemplary case of sub-time slot #n4, only three image data files are included within the sub-time slot #n4. Consequently, the controller 160 may determine that all three image data files should be allocated to the local digest video in a corresponding position to the sub-time slot #n4.

As in the case for each of the preceding examples for sub-time slots #n1, #n2, and #n4, the controller 160 may also perform an ordered ranking of the image data files based on sub-time slot scores. For example, the controller 160 may determine that image data file #n4-3 has the highest point total of the image data files corresponding to sub-time slot #n4, and determine that image data file #n4-1 has the lowest point total. Accordingly, the ordered ranking may be utilized by the controller 160 when assigning image data files to an allocation of a local digest video. For example, the ordered ranking of the image data files in any given sub-time slot may correspond to a play order of the image data files within the local digest video for the given sub-time slot. For example, in the example of sub-time slot #n4, when the three image data files of the sub-time slot #n4 are assigned to the allocated time distribution of the local digest video for sub-time slot #n, the image data file #n4-3 may be played first while the image data file #n4-1 may be played last.

In the case in which the controller 160 assigns still image data to a time distribution/allocation of a local digest video for a given time slot, the controller 160 may generate the local digest video such that the still image data files play continuously for a predetermined time period in the local digest video. For example, in the case of sub-time slot #n1 of FIG. 10, both a still image data file #n1-2 and a moving video image data file #n1-1 are assigned to the time distribution of the local digest video for the sub-time slot #n1. As a result, the controller 160 may divide the total time allocation for the sub-time slot #n1-1 between the two image data files such that the video image data plays for one portion of the allocated time and the still image data is displayed continuously for the remaining portion of the allocated time.

Figure 11:
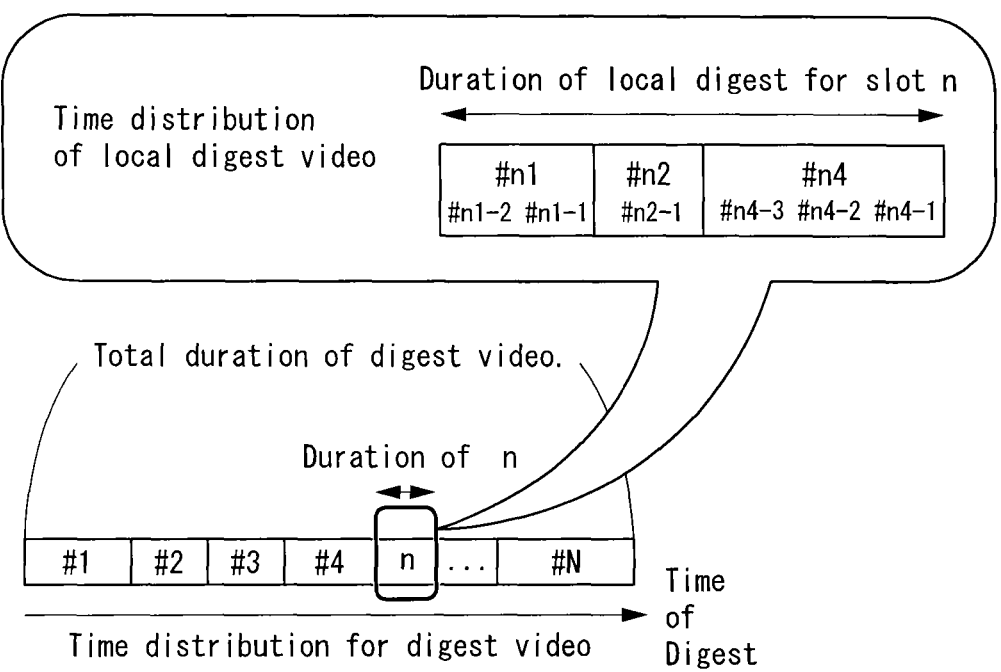
FIG. 11 illustrates an example of connecting local digest videos to form a complete digest video according to one aspect of the present disclosure.

Next, FIG. 11 illustrates an example of forming a complete digest video based on a combination of local digest videos generated for individual time slots according to one aspect of the present disclosure. Referring to FIG. 11, the local digest video corresponding to sub-time slot #n is illustrated as a combination of connected local digest videos generated for the time slots #n1, #n2, and #n4. The controller 160 may also generate local digest videos corresponding to each of the remaining time slots using similar processing discussed above in previous examples. In the example in which image data is requested for an event "A", the full-length digest video formed by the combination of local digest videos may represent a summary of all of the image data (or a portion thereof) associated with the event.

Next, a hardware description of a digest video generation apparatus according to exemplary embodiments is described with reference to FIG. 12. For simplicity, the hardware embodiment of FIG. 12 is discussed in reference to the case where a server such as server 20 embodies the digest video generation apparatus.

Figure 12:
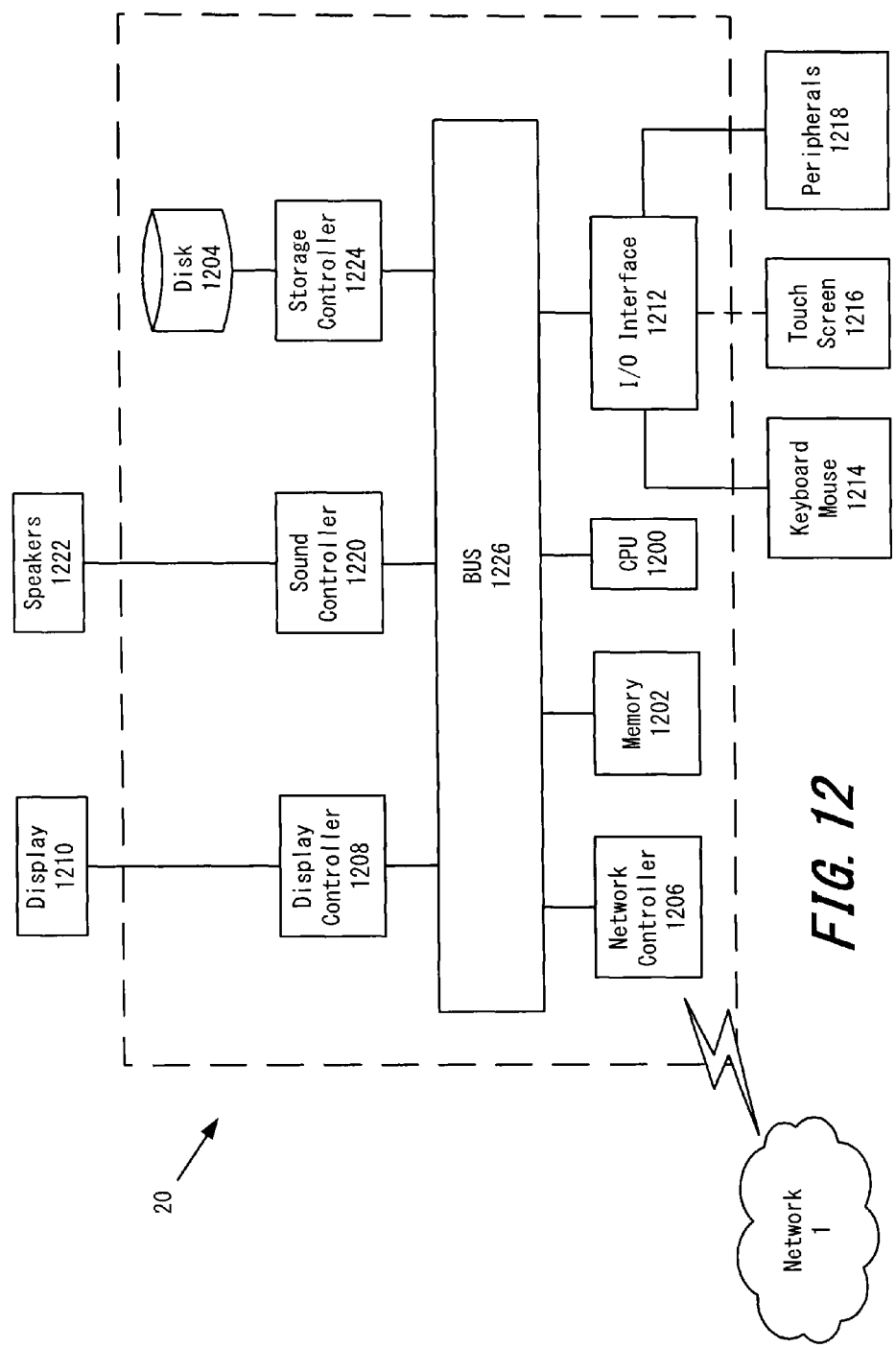
FIG. 12 illustrates an exemplary hardware embodiment according to one aspect of the present disclosure.

In FIG. 12, the server 20 includes a CPU 1200 which performs the digest video generation processes described above. The process data and instructions may be stored in memory 1202. These processes and instructions may also be stored on a storage medium disk 1204 such as a hard drive (HDD) or portable storage medium, or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the server 20 communicates, such as another server or computer.

Further, the claimed advancements may be provided as a utility application, background daemon, or component of an operating system, or combination thereof, executing in conjunction with CPU 1200 and an operating system such as Microsoft Windows 7, UNIX, Solaris, LINUX, Apple MAC-OS and other systems known to those skilled in the art. CPU 1200 may be a Xenon or Core processor from Intel of America or an Opteron processor from AMD of America, or may be other processor types that would be recognized by one of ordinary skill in the art. Alternatively, the CPU 1200 may be implemented on an FPGA, ASIC, PLD or using discrete logic circuits, as one of ordinary skill in the art would recognize. Further, CPU 1200 may be implemented as multiple processors cooperatively working in parallel to perform the instructions of the inventive processes described above. The server 20 in FIG. 12 also includes a network controller 1206, such as an Intel Ethernet PRO network interface card from Intel Corporation of America, for interfacing with network 1. As can be appreciated, the network 1 can be a public network, such as the Internet, or a private network such as an LAN or WAN network, or any combination thereof and can also include PSTN or ISDN sub-networks. The network 1 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The server 20 further includes a display controller 1208, such as a NVIDIA GeForce GTX or Quadro graphics adaptor from NVIDIA Corporation of America for interfacing with display 1210, such as a Hewlett Packard HPL2445w LCD monitor. A general purpose I/O interface 1212 interfaces with a keyboard and/or mouse 1214 as well as a touch screen panel 1216 on or separate from display 1210. General purpose I/O interface also connects to a variety of peripherals 1218 including printers and scanners, such as an OfficeJet or Desk-Jet from Hewlett Packard.

A sound controller 1220 is also provided in the server 20, such as Sound Blaster X-Fi Titanium from Creative, to interface with speakers/microphone 1222 thereby providing sounds and/or music.

The general purpose storage controller 1224 connects the storage medium disk 1204 with communication bus 1226, which may be an ISA, EISA, VESA, PCI, or similar, for interconnecting all of the components of the server 20. A description of the general features and functionality of the display 1210, keyboard and/or mouse 1214, as well as the display controller 1208, storage controller 1224, network controller 1206, sound controller 1220, and general purpose I/O interface 1212 is omitted herein for brevity as these features are known.

Obviously, numerous modifications and variations of the present disclosure are possible in light of the above teachings. It is therefore to be understood that within the scope of the appended claims, the invention may be practiced otherwise than as specifically described herein. For example, advantageous results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable processing circuits configured to execute program code and/or computer instructions to execute the functions, processes and algorithms described herein. A processing circuit includes a programmed processor, as a processor includes circuitry. A processing circuit also includes devices such as an application specific integrated circuit (ASIC) and conventional circuitry components arranged to perform the recited functions.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/or communication devices (e.g., display monitors, smart phones, tablets, personal digital assistants (PDAs)). The network may be a private network, such as a LAN or WAN, or may be a public network, such as the Internet. Input to the system may be received via direct user input and/or received remotely either in real-time or as a batch process. Additionally, some implementations may be performed on modules or hardware not identical to those described. Accordingly, other implementations are within the scope that may be claimed.

It must be noted that, as used in the specification and the appended claims, the singular forms "a," "an," and "the" include plural referents unless the context clearly dictates otherwise.

The above disclosure also encompasses the embodiments noted below.

(1) A terminal device comprising: circuitry configured to acquire designated image data stored in a memory; sort the designated image data based on a time at which the designated image data was captured; divide the sorted image data into a plurality of time slots; calculate, based on features of the designated image data corresponding to each time slot of the plurality of time slots, a time slot score for each of the plurality of time slots; allocate, based on the time slot score, a portion of a digest video to each of the plurality of time slots; generate, for each time slot, a local digest video by assigning an amount of the designated image data included in the time slot to the local digest video corresponding to the time slot; and generate the digest video by connecting the local digest videos generated for each of the plurality of time slots.

(2) The terminal device of (1), wherein the local digest video generation includes: dividing each of the plurality of time slots into a plurality of sub-time slots; calculating, based on features of the designated image data corresponding to each sub-time slot of the plurality of sub-time slots, a sub-time slot score for each of the plurality of sub-time slots, and assigning, based on the sub-time slot score, the amount of the designated image data included in each time slot to the local digest video corresponding to the time slot.

(3) The terminal device of (1) or (2), wherein the circuitry is configured to: calculate, for each time slot of the plurality of time slots, a sub-time slot score ratio represented by each sub-time slot's score relative to a total sub-time slot score for the plurality of sub-time slots included in the time slot; and assign, based on the sub-time slot score ratio, the amount of the designated imaged data included in each time slot to the local digest video corresponding to the time slot.

(4) The terminal device of any one of (1) to (3), wherein: the circuitry is configured to acquire, as metadata corresponding to the designated image data, user comments corresponding to the image data, and the circuitry is configured to calculate the sub-time slot score for each of the plurality of sub-time slots included in each of the plurality of time slots based on one or more of a quantity of image data files included in the time slot, a length of the image data included in the time slot, a sound level of audio corresponding to the image data included in the time slot, a number of faces detected in the image data included in the time slot, and a number of user comments corresponding to the image data.

(5) The terminal device of any one of (1) to (4), wherein: the circuitry is configured to determine, for each sub-time slot of the plurality of sub-time slots included in the plurality of time slots, when the sub-time slot score is below a threshold value, and the circuitry is configured to exclude the image data corresponding to the sub-time slot having the score below the threshold when generating the local digest video.

(6) The terminal device of any one of (1) to (5), wherein the circuitry is configured to calculate, based on the time slot score, a score ratio for each time slot, wherein the score ratio represents a relative measure of each time slot's score with respect to a total score for the plurality of time slots, and to allocate, based on the score ratio, the portion of the digest video to each of the plurality of time slots.

(7) The terminal device of any one of (1) to (6), wherein: the circuitry is configured to extract metadata from the designated image data, and the circuitry is configured to calculate the time slot score for each of the plurality of time slots based on the metadata corresponding to the image data included in each respective time slot.

(8) The terminal device of any one of (1) to (7), wherein the circuitry is configured to calculate the time slot score for each of the plurality of time slots based on one or more of a quantity of image data files included in the time slot, a length of the image data included in the time slot, a sound level of audio corresponding to the image data included in the time slot, and a number of faces detected in the image data included in the time slot.

(9) The terminal device of any one of (1) to (8), wherein the circuitry is configured to determine when the time slot score for each time slot of the plurality of time slots is outside a range defined by a minimum threshold value and a maximum threshold value and, in response to determining the time slot score is outside the range, the circuitry adjusts the time slot score to fall within the range.

(10) The terminal device of any one of (1) to (9), wherein the circuitry is configured to acquire, as metadata corresponding to the designated image data, user comments corresponding to the image data.

(11) The terminal device of any one of (1) to (10), wherein the circuitry is configured to determine whether the user comments correspond to a positive affinity or a negative affinity for the image data.

(12) The terminal device of any one of (1) to (11), wherein the memory is included in a server accessed on a network.

(13) The terminal device of any one of (1) to (12), wherein: the image data stored on the server is viewable by a plurality of terminal devices connected to the network, the server determines, for the image data stored on the server, a number of view requests of the designated image data, and the circuitry is configured to acquire the determined number of view requests from the server, and to calculate the time slot score for each of the plurality of time slots based on the number of view requests for the image data included in the time slot.

(14) An information processing system comprising: a server configured to store image data uploaded from one or more external devices; a digest video creating device configured to acquire designated image data from the image data stored on the server, and to create a digest video of the image data from the acquired designated image data; and a terminal device configured to acquire the digest video created by the digest video creating device and display the acquired digest video on a display, wherein the digest video creating device includes circuitry configured to: sort the designated image data based on a time at which the designated image data was captured; divide the sorted image data into a plurality of time slots; calculate, based on features of the designated image data corresponding to each time slot of the plurality of time slots, a time slot score for each of the plurality of time slots; allocate, based on the time slot score, a portion of a digest video to each of the plurality of time slots; generate, for each time slot, a local digest video by assigning an amount of the designated image data included in the time slot to the local digest video corresponding to the time slot; and generate the digest video by connecting the local digest videos generated for each of the plurality of time slots.

(15) The information processing system of (14), wherein the local digest video generation includes: dividing each of the plurality of time slots into a plurality of sub-time slots; calculating, based on features of the designated image data corresponding to each sub-time slot of the plurality of sub-time slots, a sub-time slot score for each of the plurality of sub-time slots, and assigning, based on the sub-time slot score, the amount of the designated image data included in each time slot to the local digest video corresponding to the time slot.

(16) The information processing system of (14) or (15), wherein the circuitry is configured to: calculate, for each time slot of the plurality of time slots, a sub-time slot score ratio represented by each sub-time slot's score relative to a total sub-time slot score for the plurality of sub-time slots included in the time slot; and assign, based on the sub-time slot score ratio, the amount of the designated imaged data included in each time slot to the local digest video corresponding to the time slot.

(17) The information processing system of any one of (14) to (16), wherein: the circuitry is configured to acquire, from the server as metadata corresponding to the designated image data, user comments corresponding to the image data, and the circuitry is configured to calculate the sub-time slot score for each of the plurality of sub-time slots included in each of the plurality of time slots based on one or more of a quantity of image data files included in the time slot, a length of the image data included in the time slot, a sound level of audio corresponding to the image data included in the time slot, a number of faces detected in the image data included in the time slot, and a number of user comments corresponding to the image data.

(18) The information processing system of any one of (14) to (17), wherein: the circuitry is configured to determine, for each sub-time slot of the plurality of sub-time slots included in the plurality of time slots, when the sub-time slot score is below a threshold value, and the circuitry is configured to exclude the image data corresponding to the sub-time slot having the score below the threshold when generating the local digest video.

(19) The information processing system of any one of (14) to (18), wherein the circuitry is configured to calculate, based on the time slot score, a score ratio for each time slot, wherein the score ratio represents a relative measure of each time slot's score with respect to a total score for the plurality of time slots, and to allocate, based on the score ratio, the portion of the digest video to each of the plurality of time slots.

(20) A non-transitory computer readable medium having instructions stored therein that one executed by one or more processors, cause the one or more processors to perform a method of generating a digest video, the method comprising: acquiring designated image data stored in a memory; sorting the designated image data based on a time at which the designated image data was captured; dividing the sorted image data into a plurality of time slots; calculating, based on features of the designated image data corresponding to each time slot of the plurality of time slots, a time slot score for each of the plurality of time slots; allocating, based on the time slot score, a portion of a digest video to each of the plurality of time slots; generating, for each time slot, a local digest video by assigning an amount of the designated image data included in the time slot to the local digest video corresponding to the time slot; and generating the digest video by connecting the local digest videos generated for each of the plurality of time slots.

The invention claimed is:

1. A terminal device comprising:
   circuitry configured to
      acquire image data stored in a memory;
      sort the image data based on a time at which the image data was captured;
      divide the sorted image data into a plurality of time slots;
      calculate, based on features of the image data corresponding to each time slot of the plurality of time slots, a time slot score for each of the plurality of time slots;
      allocate a percentage of a digest video to each of the plurality of time slots based on the time slot score;
      generate, for each time slot, a corresponding local digest video by assigning an amount of the image data included in a corresponding time slot to the corresponding local digest video, the amount being based on the percentage of the digest video allocated to the corresponding time slot; and
      generate the digest video by connecting local digest videos generated for each of the plurality of time slots.

2. The terminal device of claim 1, wherein the circuitry is configured to:
   divide each of the plurality of time slots into a plurality of sub-time slots;
   calculate, based on the features of the image data corresponding to each sub-time slot of the plurality of sub-time slots, a sub-time slot score for each of the plurality of sub-time slots; and
   assign, based on the sub-time slot score, the amount of the image data included in the corresponding time slot to the corresponding local digest video.

3. The terminal device of claim 2, wherein the circuitry is configured to:
   calculate, for each time slot of the plurality of time slots, a sub-time slot score ratio represented by each sub-time slot's score relative to a total sub-time slot score for the plurality of sub-time slots included in the time slot; and
   assign, based on the sub-time slot score ratio, the amount of the image data included in the corresponding time slot to the corresponding local digest video.

4. The terminal device of claim 2, wherein the circuitry is configured to:
   acquire, as metadata corresponding to the image data, user comments corresponding to the image data, and
   calculate the sub-time slot score for each of the plurality of sub-time slots included in each of the plurality of time slots based on one or more of a quantity of image data files included in the corresponding time slot, a length of the image data included in the corresponding time slot, a sound level of audio corresponding to the image data included in the corresponding time slot, a number of faces detected in the image data included in the corresponding time slot, and a number of user comments corresponding to the image data included in the corresponding time slot.

5. The terminal device of claim 2, wherein the circuitry is configured to:
   determine, for each sub-time slot of the plurality of sub-time slots included in the plurality of time slots, when the sub-time slot score is below a threshold value, and
   exclude the image data corresponding to the sub-time slot having the sub-time slot score below the threshold value when generating the corresponding local digest video.

6. The terminal device of claim 1, wherein:
   the circuitry is configured to calculate, based on the time slot score, a score ratio for each time slot,
   the score ratio represents a relative measure of each time slot's score with respect to a total score for the plurality of time slots, and
   the circuitry is configured to allocate, based on the score ratio, the percentage of the digest video to each of the plurality of time slots.

7. The terminal device of claim 1, wherein the circuitry is configured to:
   extract metadata from the image data, and
   calculate the time slot score for each of the plurality of time slots based on the metadata corresponding to the image data included in each respective time slot.

8. The terminal device of claim 1, wherein the circuitry is configured to calculate the time slot score for each of the plurality of time slots based on one or more of a quantity of image data files included in the corresponding time slot, a length of the image data included in the corresponding time slot, a sound level of audio corresponding to the image data included in the corresponding time slot, and a number of faces detected in the image data included in the corresponding time slot.

9. The terminal device of claim 1, wherein
   the circuitry is configured to determine when the time slot score for each time slot of the plurality of time slots is outside a range defined by a minimum threshold value and a maximum threshold value, and
   in response to determining the time slot score is outside the range, the circuitry is configured to adjust the time slot score to fall within the range.

10. The terminal device of claim 1, wherein the circuitry is configured to acquire, as metadata corresponding to the image data, user comments corresponding to the image data.

11. The terminal device of claim 10, wherein the circuitry is configured to determine whether the user comments correspond to a positive affinity or a negative affinity for the image data.

12. The terminal device of claim 1, wherein the memory is included in a server accessed on a network.

13. The terminal device of claim 12, wherein:
   the image data stored on the server is viewable by a plurality of terminal devices connected to the network,
   the server determines, for the image data stored on the server, a number of view requests of the image data, and
   the circuitry is configured to acquire the determined number of view requests from the server, and to calculate the time slot score for each of the plurality of time slots based on the number of view requests for the image data included in the corresponding time slot.

14. An information processing system comprising:
a server configured to store image data uploaded from one or more external devices;
a digest video creating device configured to acquire the image data stored on the server, and to create a digest video from the acquired image data; and
a terminal device configured to acquire the digest video created by the digest video creating device and display the acquired digest video on a display, wherein
the digest video creating device includes circuitry configured to:
sort the image data based on a time at which the image data was captured;
divide the sorted image data into a plurality of time slots;
calculate, based on features of the image data corresponding to each time slot of the plurality of time slots, a time slot score for each of the plurality of time slots;
allocate a percentage of a digest video to each of the plurality of time slots based on the time slot score;
generate, for each time slot, a corresponding local digest video by assigning an amount of the image data included in a corresponding time slot to the corresponding local digest video, the amount being based on the percentage of the digest video allocated to the corresponding time slot; and
generate the digest video by connecting local digest videos generated for each of the plurality of time slots.

15. The information processing system of claim 14, wherein the circuitry is configured to:
divide each of the plurality of time slots into a plurality of sub-time slots;
calculate, based on the features of the image data corresponding to each sub-time slot of the plurality of sub-time slots, a sub-time slot score for each of the plurality of sub-time slots; and
assign, based on the sub-time slot score, the amount of the image data included in the corresponding time slot to the corresponding local digest video.

16. The information processing system of claim 15, wherein the circuitry is configured to:
calculate, for each time slot of the plurality of time slots, a sub-time slot score ratio represented by each sub-time slot's score relative to a total sub-time slot score for the plurality of sub-time slots included in the time slot; and
assign, based on the sub-time slot score ratio, the amount of the image data included in the corresponding time slot to the corresponding local digest video.

17. The information processing system of claim 15, wherein the circuitry is configured to:
acquire, from the server as metadata corresponding to the image data, user comments corresponding to the image data, and
calculate the sub-time slot score for each of the plurality of sub-time slots included in each of the plurality of time slots based on one or more of a quantity of image data files included in the corresponding time slot, a length of the image data included in the corresponding time slot, a sound level of audio corresponding to the image data included in the corresponding time slot, a number of faces detected in the image data included in the corresponding time slot, and a number of user comments corresponding to the image data included in the corresponding time slot.

18. The information processing system of claim 15, wherein the circuitry is configured to:
determine, for each sub-time slot of the plurality of sub-time slots included in the plurality of time slots, when the sub-time slot score is below a threshold value, and
exclude the image data corresponding to the sub-time slot having the sub-time slot score below the threshold value when generating the corresponding local digest video.

19. The information processing system of claim 14, wherein:
the circuitry is configured to calculate, based on the time slot score, a score ratio for each time slot,
the score ratio represents a relative measure of each time slot's score with respect to a total score for the plurality of time slots, and
the circuitry is configured to allocate, based on the score ratio, the percentage of the digest video to each of the plurality of time slots.

20. A non-transitory computer readable medium having instructions stored therein that when executed by one or more processors, cause the one or more processors to perform a method of generating a digest video, the method comprising:
acquiring image data stored in a memory;
sorting the image data based on a time at which the image data was captured;
dividing the sorted image data into a plurality of time slots;
calculating, based on features of the image data corresponding to each time slot of the plurality of time slots, a time slot score for each of the plurality of time slots;
allocating a percentage of a digest video to each of the plurality of time slots based on the time slot score;
generating, for each time slot, a corresponding local digest video by assigning an amount of the image data included in a corresponding time slot to the corresponding local digest video, the amount being based on the percentage of the digest video allocated to the corresponding time slot; and
generating the digest video by connecting local digest videos generated for each of the plurality of time slots.

* * * * *